United States Patent

[11] 3,572,926

[72] Inventors Stanley F. Coil
Washington;
William R. Horst, Dayton, Ohio

[21] Appl. No. 763,159
[22] Filed Sept. 27, 1968
[45] Patented Mar. 30, 1971
[73] Assignee The National Cash Register Company
Dayton, Ohio

[54] X AND Y COORDINATE AXES POSITIONING MECHANISM
14 Claims, 16 Drawing Figs.

[52] U.S. Cl. .......... 355/53
[51] Int. Cl. .......... G03b 17/32
[50] Field of Search .......... 355/53, 54, 72, 75, 86

[56] References Cited
UNITED STATES PATENTS
1,846,972 2/1932 Koppe .......... 355/53

*Primary Examiner*—John M. Horan
*Attorneys*—Louis A. Kline, Albert L. Sessler, Jr. and Elmer Wargo

ABSTRACT: A positioning mechanism for moving a film carrier in a plane along *x* and *y* coordinate axes therein. The means for supporting and moving the film carrier in said plane includes a torsion bar which facilitates accurate movement along said axes, which is necessary when the mechanism is used to produce or locate extremely small images of the photochromic type on a film. Simple controls including electrical relays and solenoids are used to control the indexing of the film carrier.

Patented March 30, 1971 3,572,926

8 Sheets-Sheet 1

INVENTORS
STANLEY F. COIL &
WILLIAM R. HORST

BY Louis A Kline
Albert L. Sessler
Elmer Wargo
THEIR ATTORNEYS

INVENTORS
STANLEY F. COIL &
WILLIAM R. HORST
BY
Louis A. Kline
Albert L. Sesslerf
Elmer Wargo
THEIR ATTORNEYS Patented March 30, 1971 3,572,926

8 Sheets-Sheet 3

INVENTORS
STANLEY F. COIL &
WILLIAM R. HORST

BY

Louis A. Kline
Albert L. Sessler
Elmer J. Wargo

THEIR ATTORNEYS

Patented March 30, 1971 3,572,926

8 Sheets-Sheet 4

INVENTORS
STANLEY F. COIL &
WILLIAM R. HORST

BY

Louis A. Kline
Albert L. Sessler, Jr.
Elmer Wargo

THEIR ATTORNEYS

INVENTORS
STANLEY F. COIL &
WILLIAM R. HORST

BY
Louis A. Kline
Albert L. Sessler
Elmer Wargo
THEIR ATTORNEYS

INVENTORS
STANLEY F. COIL &
WILLIAM R. HORST
BY
THEIR ATTORNEYS

Patented March 30, 1971 3,572,926

8 Sheets-Sheet 7

INVENTORS
STANLEY F. COIL &
WILLIAM R. HORST

BY Louis A. Kline
Albert L. Sessler
Elmer Wargo
THEIR ATTORNEYS

INVENTORS
STANLEY F. COIL &
WILLIAM R. HORST

BY Louis A. Kline
Albert L. Sessler
Elmer Wargo
THEIR ATTORNEYS

X AND Y COORDINATE AXES POSITIONING MECHANISM

BACKGROUND OF THE INVENTION

This invention relates to an *x* and *y* coordinate axes positioning or indexing mechanism which is especially useful where extremely accurate location is required, as is necessary in photometachromic devices.

The present invention may be used in photometachromic devices like reducing cameras and viewers of the type shown in U.S. Pat. No. 3,185,026, which issued May 25, 1965, on the application of Carl O. Carlson et al., and in U.S. Pat. No. 3,260,153, which issued Jul. 12, 1966, on the application of Tirey C. Abbott, Jr., et al.; both of these patents are assigned to the assignee of the present invention.

The photosensitive films which are used in photometachromic (hereinafter called photochromic) devices are made of photochromic materials which have the inherent properties of being transparent and containing a molecular dispersion of reversible light-sensitive dyes which become opaque upon exposure to radiation in the blue-violet portion of the electromagnetic spectrum. When exposed, or in the opaque condition, the photochromic materials can be conveniently "erased" by subjecting the exposed area thereof to a relatively high intensity radiation from the central portion of the optical spectrum.

The change of state of the photochromic materials when exposed occurs at a molecular level, thereby providing very high resolution characteristics capable of recording images which have been reduced in size by a factor of greater than 200 to 1. The corresponding reduction in area is greater than 40,000 to 1. Such a high resolution capability requires a very accurate indexing or positioning mechanism to obtain maximum effectiveness from photochromic devices like reducing cameras and viewers. The present invention provides such an accurate indexing or positioning mechanism.

SUMMARY OF THE INVENTION

The present invention relates to a positioning or indexing apparatus for moving a film support assembly in a plane along *x* and *y* coordinate axes therein. The apparatus includes a base having a pair of spaced vertical supports upstanding therefrom. A first slide member is slidably mounted on one of the supports, while a second slide member is slidably mounted on the remaining vertical support. A pair of spaced parallel rods is positioned perpendicularly to said vertical supports, each of said rods having one end thereof secured to said first slide member and the remaining end thereof secured to the second slide member. The film support assembly is slidably mounted on said rods between the first and second slide members so as to be reciprocatingly movable in said plane along *x* and *y* coordinates therein. The apparatus also includes a torsion bar means operatively connected between the first and second slide members so as to assist in accurately indexing and positioning the film support assembly along said *x* and *y* coordinates relative to a fixed point, like the optical axis of a reducing camera or a viewing apparatus. The apparatus further includes simplified control means for controlling the movement of the film support assembly.

DESCRIPTION OF THE PREFERRED EMBODIMENT

Figure 1:
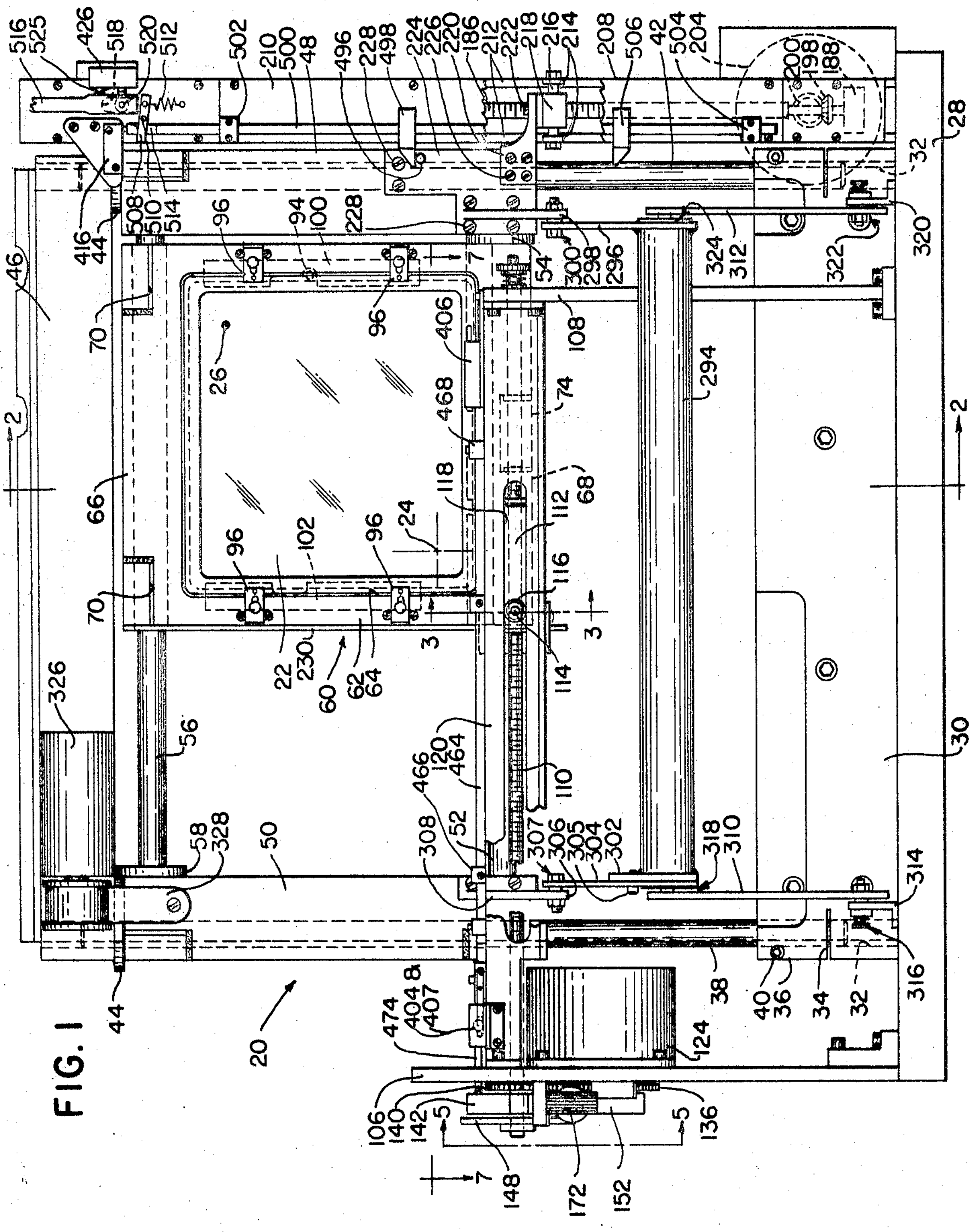
FIG. 1 is an elevational view of a portion of a reducing camera, looking at the back side of a film support assembly and showing the indexing means of this invention, which is used to index said support assembly in two directions which are mutually perpendicular to each other while maintaining said support assembly in a plane which is perpendicular to the optical axis of the camera.

FIG. 1 is an elevational view of a portion of a reducing camera, looking at the back side of a film support assembly therein and showing the indexing means of this invention, which is designated generally as 20. The indexing means 20 may be used in reducing cameras and viewers in general, and in the type shown in the patents previously cited, in the "-Background of the Invention."

When the indexing means 20 is used with a reducing camera, for example, the image to be recorded thereby is directed along its fixed optical axis 24 (which is represented by the intersection of cross lines in FIG. 1) and is brought to focus on the film plane 22. The film plane 22, as shown in FIG. 1, is positioned (relative to the optical axis 24) for printing at the last position thereon. To print at the first print position 26 on the film plane 22, the indexing means 20 would have to move the film support assembly down and to the left (as viewed in FIG. 1) to enable the first print position 26 to be positioned and centered at the optical axis 24. A typical, reduced-image size recorded on the film plane 22 at each print position is approximately 0.040 inch by 0.060 inch, representing the information in a source document measuring 8½ inches by 11 inches. At such as reduction, approximately one hundred thousand such documents can be stored on a film plane having an area of approximately 15½ square inches. With such high-density storage, it is apparent that accurate registration along $x$ and $y$ coordinates is necessary for recording information on the film plane 22 and for retrieving it at some subsequent time.

The general framework of the indexing means 20 is constructed in the following manner. The indexing means 20 is supported on a thick metal base 28, shown in FIGS. 1 and 2. Secured to the base 28 is a metal support bar 30, which is positioned on one edge as shown. Each end of the bar 30 has a hole 32 (FIG. 1) drilled therein, a horizontal cut 34, and a vertical cut (not shown) in the end face 36 thereof. A vertical support or steel rod 38 has one end thereof positioned in a hole on the left end (as viewed in FIG. 1) of the bar 30 and is clamped therein by fasteners 40, which pull together the halves of the end of the bar 30, which were formed by the vertical cut in the face 36. Similarly, another steel rod 42 is positioned and secured in the right end (as viewed in FIG. 1) of the bar 30. The rods 38 and 42 are parallel to each other and are perpendicular to the base 28. The upper ends of the rods 38 and 42 are mounted in special slide bearings 44 (to be described later), which bearings are secured to an upper metal cross bar 46 and which bearings permit the rods 38 and 42 to expand along their lengths for changes in temperature.

Slide members are mounted on the rods 38 and 42 for movement in a vertical direction relative to the base 28 as follows. A first slide member 48 (FIG. 1), which is generally bar-like in construction, has a conventional split linear ball bearing located in each end thereof to provide for low friction and to permit little play or looseness between the slide member 48 and the rod 42. The bearing may be a Thomson split linear ball bearing manufactured by Thomson Industries Incorporated, of Manhasset, New York, United States of America, and is not shown in the drawings. The same construction is used for mounting a second slide member 50 on the rod 38.

A pair of spaced parallel rods is mounted on the first and second slide members 48 and 50 (FIG. 1), respectively, as follows. The second slide member 50 has the left end of a lower rod 52 (as viewed in FIG. 1) secured thereto, while the right end of the rod is supported in a special bearing 54, which is secured to the first slide member 48. The right end of an upper rod 56 is secured to the upper end of the first slide member 48, while the left end of the rod 56 is supported in a special bearing 58 (similar to the bearing 54, to be described later), which bearing 58 is secured to the upper end of the second slide member 50. The rods 52 and 56 are parallel to each other and are secured to the first and second slide members 48 and 50, respectively, in the manner just described, so as to prevent a twisting of the plane formed by these slide members and the lower and upper rods 52 and 56, respectively.

Figures 2, 3, 4:
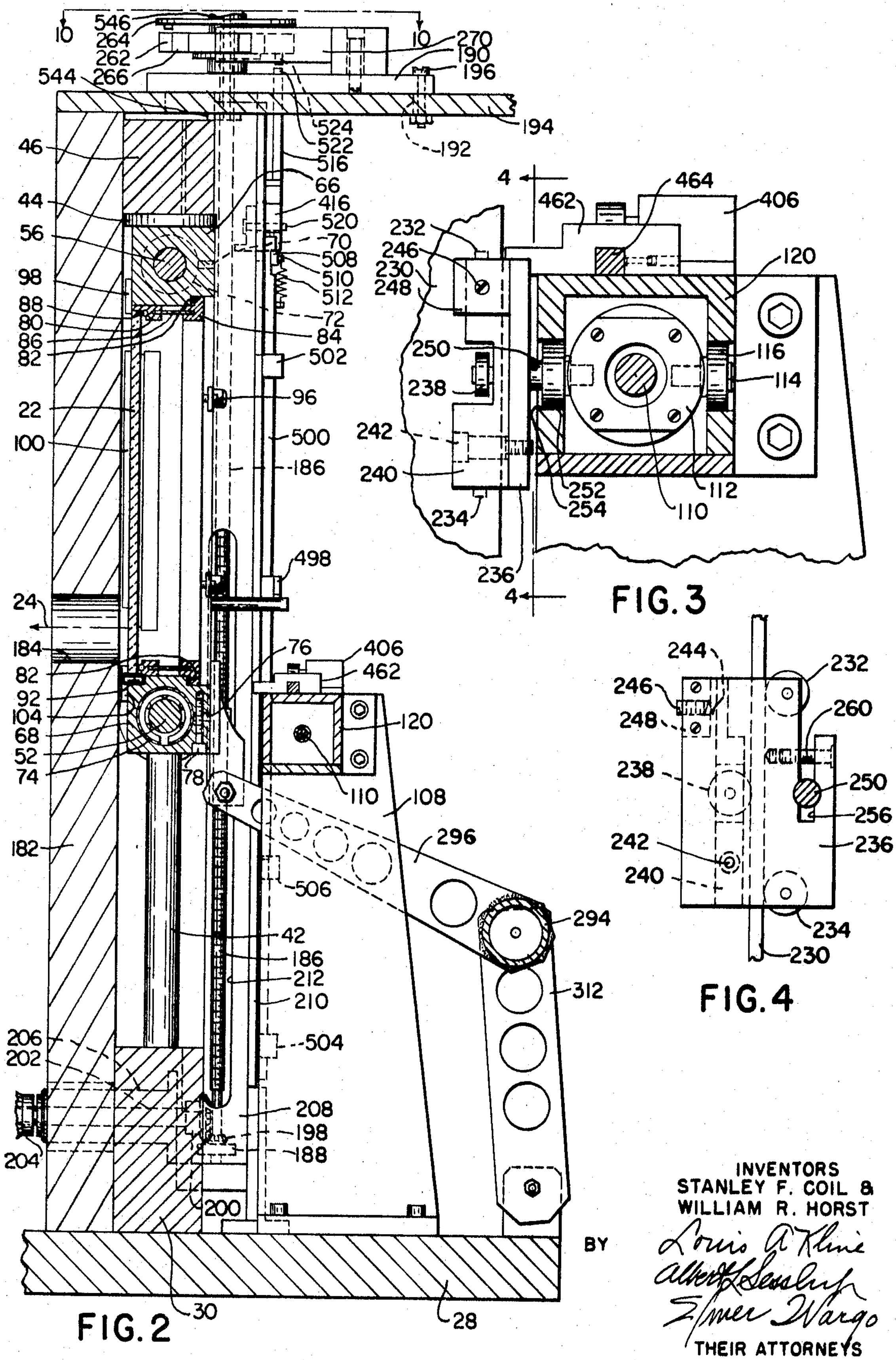
FIG. 2 is an elevational view of one side of the indexing means, shown partly in cross section, and is taken along the line 2–2 of FIG. 1, showing more details of the means for mounting the film support assembly.
FIG. 3 is an elevational view, partly in cross section, showing details of a means for indexing the film support assembly in a direction which is parallel to the base of the camera, and is taken along the line 3–3 of FIG. 1.
FIG. 4 is an elevational view, partly in cross section, showing additional details of the means for indexing the film support assembly in a direction which is parallel to the base of the camera, and is taken along the line 4–4 of FIG. 3.

A film support assembly, designated generally as 60 (FIG. 1), is slidably mounted on the lower and upper rods 52 and 56, respectively, by the following construction. The support assembly 60 includes a thick square metal plate 62, having therein a square recessed opening 64, into which the film plane 22 is positioned. The plate 62 has opposed parallel sides 66 and 68, which are drilled throughout its length to receive the rods 56 and 52, respectively. The side 66, has, on opposed ends thereof, slits 70, which are cut deep enough to reach the hole passing through the side 66. A conventional split linear bearing 72 (FIG. 2), like the one previously mentioned, is located between the rod 56 and the side 66 near each slit 70, so that the plate 62 is supported on two bearings 72 on the rod 56. The plate 62 is similarly supported on its lower side 68; however, only one conventional split linear bearing 74 is used, and it is mounted between the rod 52 and the side 68, as best shown in FIG. 2. The side 68 also has a slit 76, which reaches into the drilled hole in which the bearing 74 is mounted, enabling a fastener 78 to clamp the bearing around the rod 52 to eliminate any play or looseness between the plate 62 and the rods 52 and 56 and to minimize friction therebetween. By this construction, the film plane 22, which is secured to the plate 62 (by means to be described later), may be moved in a horizontal direction (relative to the optical axis represented by the point 24) along the rods 52 and 56. The film plane 22 may also be moved in a vertical direction along the rods 38 and 42, as previously mentioned.

The film plane 22 (FIGS. 1 and 2) is detachably secured to the plate 62 by the following construction. The film plane 22, which may be of a rigid transparent material like glass or plastic with a photosensitive coating thereon, is loosely held by a film holder prior to being inserted into the position shown in FIG. 2. The film holder includes a first generally square member 80, having the cross section shown in FIG. 2, which member 80 has a matching shape and outside dimensions enabling it to be fitted into the opening 64 in the plate 62. As can be seen from FIG. 2, the plate 62 has a recess 82 formed around one face thereof. A second generally square member 84, having the cross section shown in FIG. 2 and having outside dimensions enabling it to be fitted into the opening in the plate 62 near the recess 82, is also shown in FIG. 2. Each of the first and second square members 80 and 84, respectively, has facing recesses around its perimeter, into which a band-type metal strip 86 is inserted for holding the members 80 and 84 together; the strip 86 extends around the perimeters of the members 80 and 84 while fitting into said recesses. The member 80 has in its face a recess which is adjacent to the film plane 22 (as shown in FIG. 2), and into this recess a resilient member 88 (having a circular cross section) is positioned. The first square member 80 has conventional, spaced fingers 90 (not shown) extending to the left (as viewed in FIG. 2), so as to support the film plane 22 prior to its insertion into the opening 64 of the plate 62. Once the film plane 22 is inserted into the opening 64, its bottom edge rests upon two spaced bearing supports 92 (only one of which is shown in FIG. 2). The bearing supports 92 are secured in complementary grooves in the side 68 and provide a fixed horizontal reference line relative to the optical axis 24. A bearing support 94 (similar to the bearing supports 92) is secured in the right side of the plate 62 (as viewed in FIG. 1), and the three bearing supports 92 and 94 provide three lines of contact for locating the film plane 22 relative to the optical axis 24 each time a film plane 22 is inserted into the opening 64 of the plate 62. After the film plane 22 is inserted into the opening 64, and the conventional toe clamps (FIGS. 1 and 2) are tightened, the resilient member 88 (FIG. 2) resiliently urges the film plane 22 against the strip-type stops 98, 100, 102, and 104, which are secured to the plate 62 to keep the film plane 22 perpendicular to the optical axis 24.

The means for indexing the film support assembly 60 in a horizontal direction is shown principally in FIGS. 1 and 2 and includes the spaced parallel vertical supports 106 and 108, the lower ends of which are secured to the base 28. A horizontally positioned lead screw 110 is rotatably mounted in the supports 106 and 108 and is used to move the film support assembly 60 horizontally, as viewed in FIG. 1. The screw 110 is a conventional precision lead screw which is used with a precision ball bearing nut 112 made by Saginaw Steering Gear Division of General Motors Corporation, Saginaw, Michigan, United States of America. The nut 112 is restrained from rotation on the lead screw 110 as follows. One side of the nut 112 has a shaft 114 (FIGS. 1 and 3) extending therefrom in a direction which is perpendicular to the longitudinal axis of the lead screw 110, and a roller 116 is rotatably mounted and restrained against axial movement thereon. The roller 116 fits into a slot 118 (FIG. 1), which is located in one side of a U-shaped channel member 120 (which is part of a tube which is generally square in cross section), whose ends are secured to the vertical supports 106 and 108. The bearing nut 112 is also secured to the film support assembly 60 (by means to be described later). When the lead screw 110 is turned, one way or the other, the bearing nut 112 is moved horizontally either to the left or to the right (as viewed in FIG. 1), and the assembly 60 moves correspondingly to the left or to the right relative to the optical axis 24.

Figure 5:
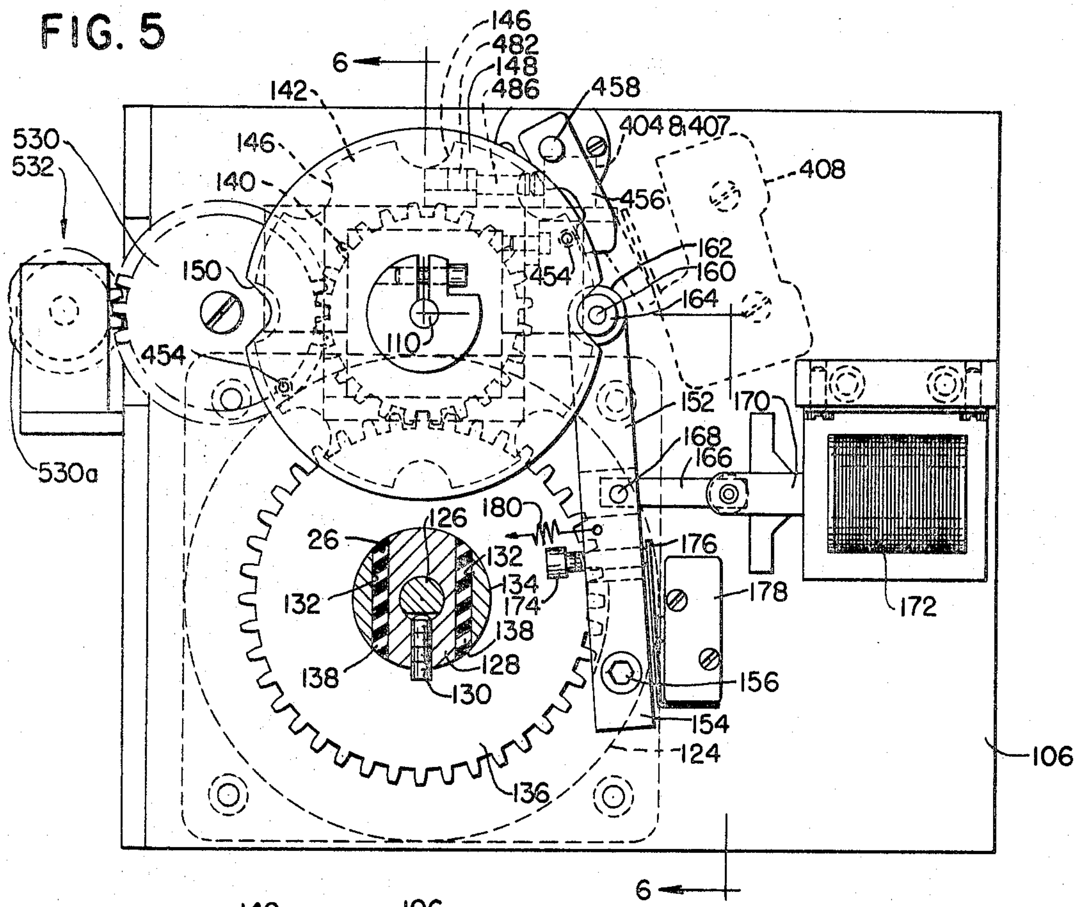
FIG. 5 is an enlarged elevational view, partly in cross section, showing additional details of the means for indexing the film support assembly in a direction which is parallel to the base of the camera, and is taken along the line 5–5 of FIG. 1.
Figure 6:
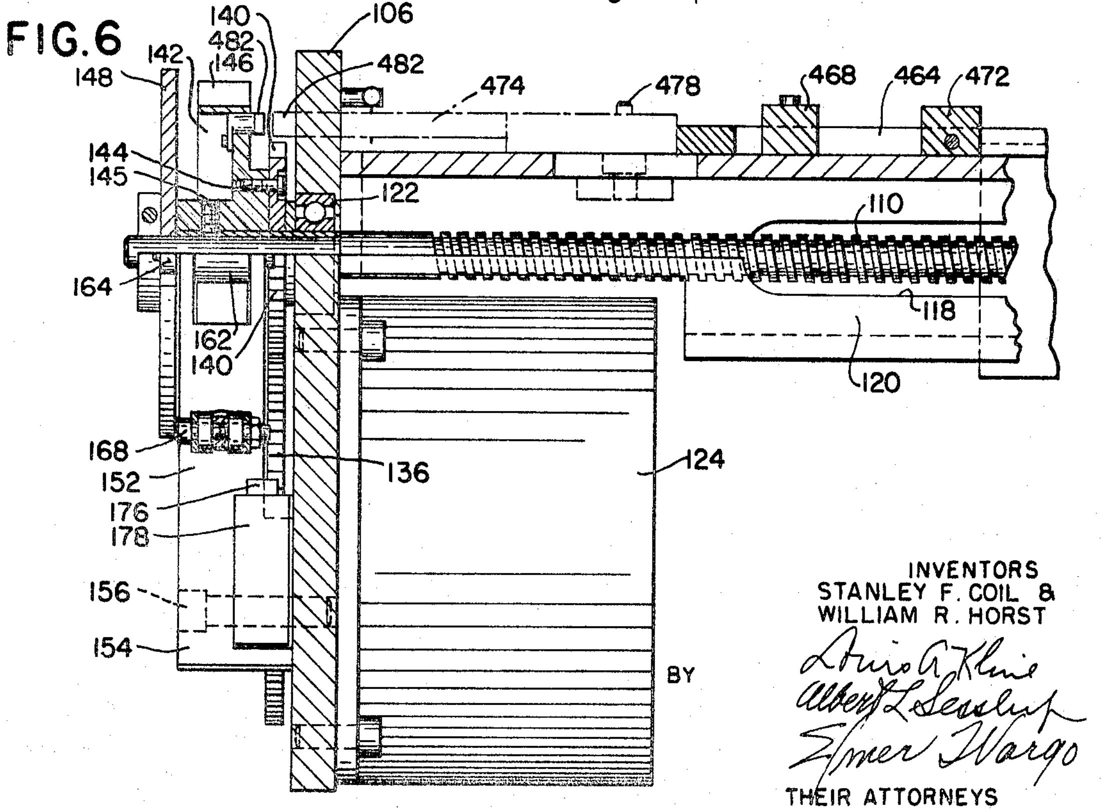
FIG. 6 is an elevational view of the structure shown in FIG. 5 and is taken along the line 6–6 thereof.

FIGS. 1, 5, 6, and 7A show the means for rotating the lead screw 110 in one horizontal direction or the other. The lead screw 110 is rotatably supported near its left end (as viewed in FIG. 6) in a bearing 122, which is fixed in the vertical support 106. A motor 124 is detachable secured to one side of the support 106, and its shaft 126 passes through a suitable opening in this support to the opposite side thereof, where the shaft 126 is detachably fixed to a drive member 128 by a fastener 130 (FIG. 5). The drive member 128 is positioned between opposed faces 132 of a slotted driving hub 134 on a gear 136. Resilient pads 138 are sandwiched between the drive member 128 and the opposed faces 132 of the hub 134 to provide a resilient driving connection between the motor 124 and the lead screw 110. The motor 124 is a reversible motor of the constant torque variety, like a low-speed synchronous induction motor manufactured by General Electric Company, and it seems to work best when connected to a driven member by a resilient connection. The gear 136 has teeth which are in mesh with the teeth of a gear 140, which is mounted on the lead screw 110 but not connected thereto. The gear 140 is fixed to rotate with a detent wheel 142 by fasteners 144 (only one of which is shown in FIG. 6), and the detent wheel 142 is fixed to the lead screw 110 by a fastener 145.

The detent wheel 142 (FIGS. 1, 5, 6, and 7A) is part of a control means for controlling the rotation of the lead screw 110. The detent wheel 142 has a plurality of equally spaced, axially-aligned grooves 146 on its periphery. The number of grooves 146 on the detent wheel 142 is determined in accordance with the smallest angle of rotation desired in the lead screw 110, so as to produce the smallest incremental advance in the film support assembly 60 in a horizontal direction. For example, when the detent wheel 142 rotates counterclockwise (as viewed in FIG. 5) for an angular distance equivalent to that represented by two adjacent grooves 146, the film support assembly 60 is indexed to the right (as viewed in FIG. 1) for a distance equal to the smallest amount as determined by the geometry of the gears, lead screw, etc., selected. In order to provide more flexibility in controlling the extent of travel of the film support assembly 60, a programming plate 148 is provided. The plate 148 is pinned to the detent wheel 142 by a pin (not shown) for rotation therewith. In the embodiment shown, the programming plate 148 has two recesses 150 located 180° apart on its periphery, as is best shown in FIG. 5. With two recesses 150 on the plate 148, the horizontal movement of the film support assembly 60 will be four times the smallest amount previously stated.

Figure 7A:
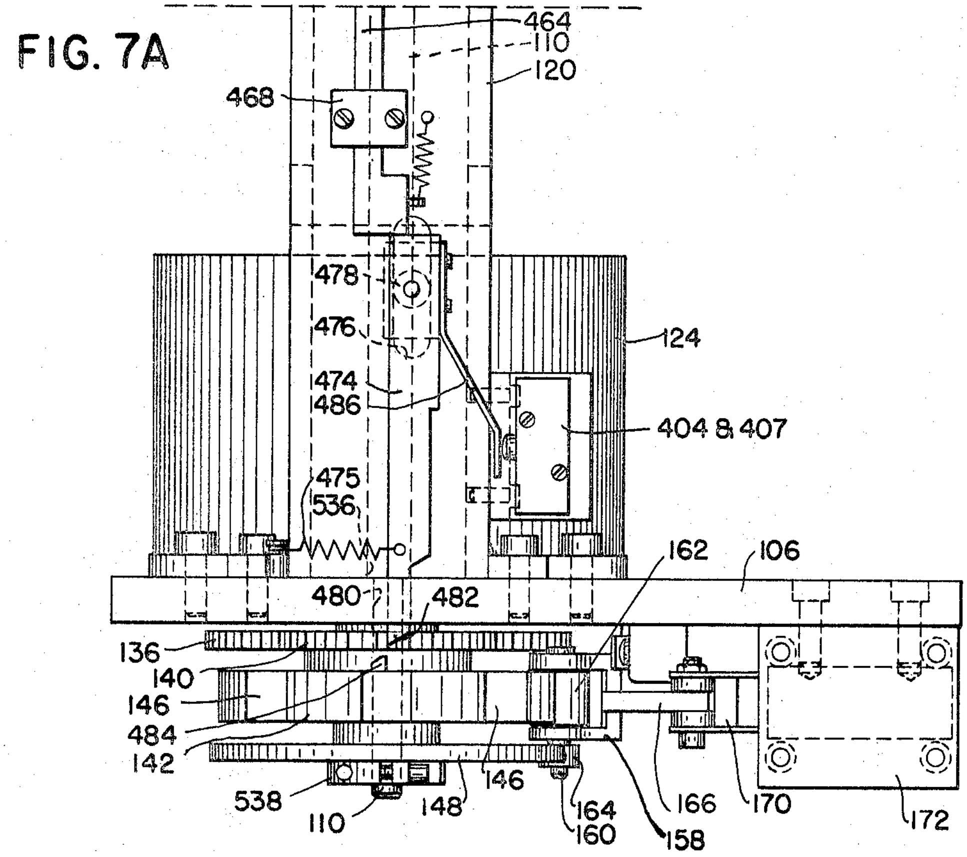
FIGS. 7A and 7B taken together (FIG. 7A being on the sheet with FIG. 8) show an enlarged plan view of the means for indexing the film support assembly in a direction which is parallel to the base of the camera, and is taken along the line 7–7 of FIG. 1, with the support assembly removed for ease of illustration.

The detent wheel 142 and the programming plate 148, which are part of the control means for controlling the rotation of the lead screw 110, cooperate with a control lever 152 (FIGS. 1, 5, 6, and 7A) as follows. The control lever 152 has one end, 154, which is pivotally joined to the vertical support 106 by a fastener 156. The other end of the lever 152 has a bifurcated portion 158 (best shown in FIG. 7A), which has a shaft 160 passing through its arms. A first roller 162 is rotatably mounted on the shaft 160 between the arms of the bifurcated portion 158 of the lever 152, and the roller travels on the periphery of the detent wheel 142 and drops into selected grooves 146 to stop the rotation of the detent wheel 142. A second roller 164 is rotatably mounted on the shaft 160 between one arm of the bifurcated portion 158 and the end of the shaft 160, as is best shown in FIG. 7A. This second roller 164 rides on the periphery of the programming plate 148 and drops into its recesses 150 to stop the rotation of the plate 148. Because the detent wheel 142 and the programming plate 148 are pinned together to rotate together, and because the rollers 162 and 164 are mounted on the same shaft 160, the roller 162 will drop into a groove 146 of the detent wheel 142 only when the roller 164 drops into a recess 150 on the programming plate 148. The control lever has one end of a lever 166 (FIG. 5) pivotally joined thereto between the ends thereof by a fastener 168. The remaining end of the lever 166 (FIG. 5) is pivotally joined to the operating arm 170 of a solenoid 172, which is secured to the vertical support 106. When the solenoid 172 is energized by circuit control means (shown in FIG. 9, to be later described), its operating arm 170 is pulled inwardly of the solenoid and pivots the control lever 152 clockwise about the fastener 156 (as viewed in FIG. 5), thereby pulling the rollers 162 and 164 out of their respective recesses 146 and 150. As the control lever 152 pivots clockwise, an adjusting screw 174, carried thereby, contacts a lever 176 on a normally open (hereinafter designated N.O.) switch 178 to close it and thereby energize the motor 124. The direction of rotation of the motor 124 is controlled by the circuit control means shown in FIG. 9. Assuming that the motor shaft 126 rotates clockwise (as viewed in FIG. 5), the gear 136 rotates therewith, while the gear 140, in mesh therewith, rotates counterclockwise. Because the gear 140 rotates counterclockwise, the detent wheel 142, which is pinned thereto, also rotates counterclockwise. As soon as the detent wheel 142 begins to rotate, the solenoid 172 is deenergized, permitting the roller 164 to ride on the periphery of the programming plate 148. The rollers 164 and 162 are urged against the programming plate 148 and the detent wheel 142, respectively, by the tension spring 180, which urges the control lever 152 counterclockwise (as viewed in FIG. 5). When the next approaching recess 150 in the programming plate 148 approaches the roller 164, the roller is moved therein by the spring 180, and, similarly, the roller 162 on the detent wheel 142 drops into the groove 146 which is aligned with said next approaching recess 150 to stop the rotation of the lead screw 110. As the control level 152 moves counterclockwise by the urging of the spring 180, the screw 174 thereon moves away from the lever 176 of the N.O. switch 178 to permit it to open and thereby deenergize the motor 124.

The means for indexing the film support assembly 60 in a vertical direction are shown principally in FIGS. 1, 2, 3, and 4. In FIG. 2, there is shown a vertically positioned plate 182, which is secured to the bars 30 and 46 and which plate 182 has therein an aperture 184 located at the optical axis 24. A lead screw 186 is also utilized for moving the film support assembly 60 in an up-and-down direction which is perpendicular to the horizontal direction supplied by the lead screw 110. The lower end of the lead screw 186 is rotatably mounted in an end bearing 188, and its upper end (as viewed in FIG. 2) is rotatably mounted in a bearing (not shown) in a plate 190 (FIG. 2). The plate 190 fits over an opening 192 in a top plate 194 and is secured thereto by fasteners 196. The plate 194 is secured to the plate 182 and is perpendicular thereto. The lower end of the lead screw 186 has a bevel gear 198 fixed to rotate therewith (FIGS. 1 and 2), and this gear is in mesh with a mating bevel gear 200, which is fixed to the shaft 202 of a motor 204, which is secured to the base 28. The shaft 202 of the motor 204 is rotatably mounted in a bushing 206, which is mounted in mating aligned apertures in the plate 182 and the bar 30, as is vest shown in FIG. 2. The lead screw 186 is enclosed in a tube 208, which is substantially square in cross section and includes a U-shaped channel member (similar to the channel member 120, as shown in FIG. 2) and a cover 210 therefor. The tube 208 has, in opposed sides thereof (FIGS. 1 and 2), opposed slots 212, each of which is wide enough to receive a roller 214. Each roller 214 (FIG. 1) is rotatably mounted and retained on a stub shaft 216, which extends outwardly from a special nut 218 mounted on the lead screw 186. The nut 218 is similar to the nut 112 mounted on the lead screw 110 (FIG. 1). Whenever the lead screw 186 is rotated in one direction or the other, the nut 112 either rises or falls (perpendicularly to the base 28), depending upon the direction of rotation of the lead screw 186. The nut 218 is retained against axial rotation on the lead screw 186 by the rollers 214, which travel in their associated slots 212 in the tube 208.

The rise-and-fall motion of the nut 218 on the lead screw 186 (which motion is perpendicular to the horizontal motion of the nut 112 on the lead screw 110) is transferred to the film support assembly 60 (FIG. 1) as follows. A bracket 220 has one end secured to the nut 218 by a fastener 222, and its other end is secured to a second bracket 224 by fasteners 226. The second bracket 224 is secured to the first slide member 48 by fasteners 228. Because the film support assembly 60 is mounted on the rods 52 and 56, whose ends are secured in the first and second slide members 48 and 50, respectively, the assembly 60 is moved up and down in accordance with the movement of the nut 218 on the lead screw 186. The motor 124, which drives the lead screw 186, is rotated in one direction or the other by the control means shown in FIG. 9 and to be described later.

To enable the film support assembly 60 to be moved vertically and yet provide a connection between the means for indexing the assembly 60 horizontally, a construction shown principally in FIGS. 1, 3, and 4 is utilized. The construction includes a metal strip 230, which is positioned perpendicularly to the base 28 and is secured to the left side (as viewed in FIG. 1) of the film support assembly 60. Two spaced rollers 232 and 234 are rotatably mounted on a plate 236, so that their peripheries engage one side of the strip 230, as is best shown in FIGS. 3 and 4. A third roller, 238, is also rotatable mounted on the plate 236, so that its periphery engages the opposite side of the strip 230, as is best shown in FIG. 4. To provide a positive fit between the three rollers 232, 234, and 238 and the strip 230, the roller 238 is actually rotatably mounted on a bar 240, one end of which is pivotally joined to the plate 236 by a fastener 242. The remaining end of the bar 240 is urged clockwise (as viewed in FIG. 4) by a spring 244. An adjusting screw 246, which is mounted in a block 248 (secured to the plate 236) is utilized to adjust the compression of the spring 244, which resiliently urges the bar 240 clockwise and thereby urges the periphery of the roller 238 against the strip 230. From FIG. 4, it is apparent that the roller 238 is positioned between the rollers 232 and 234 so as to provide three lines of contact along the length of the strip 230 as the plate 236 is moved up and down, as viewed in said figure, to thereby minimize any looseness or play between the film support assembly and the horizontal lead screw 110.

The connection between the horizontal lead screw 110 and the plate 236 is best shown in FIGS. 3 and 4. The nut 112, which cooperates with the lead screw 110, has a shaft 250 extending from one side thereof, which shaft is axially aligned with the shaft 114. A roller 252, which is rotatably mounted on the shaft 250, engages the sides of a slot 254 extending along the length of the channel member 120. The slot 254 is aligned with the slot 118, which is best shown in FIG. 1. The remaining end of the shaft 250 is square in cross section, is positioned in a slot 256 in the plate 236, and is clamped thereto by a tightening fastener 260 (FIG. 4). As the roller 252 is moved in the slot 254 by the nut 112, the plate 236 and the film support assembly 60 are also moved in a direction parallel to the base 28.

Figure 10:
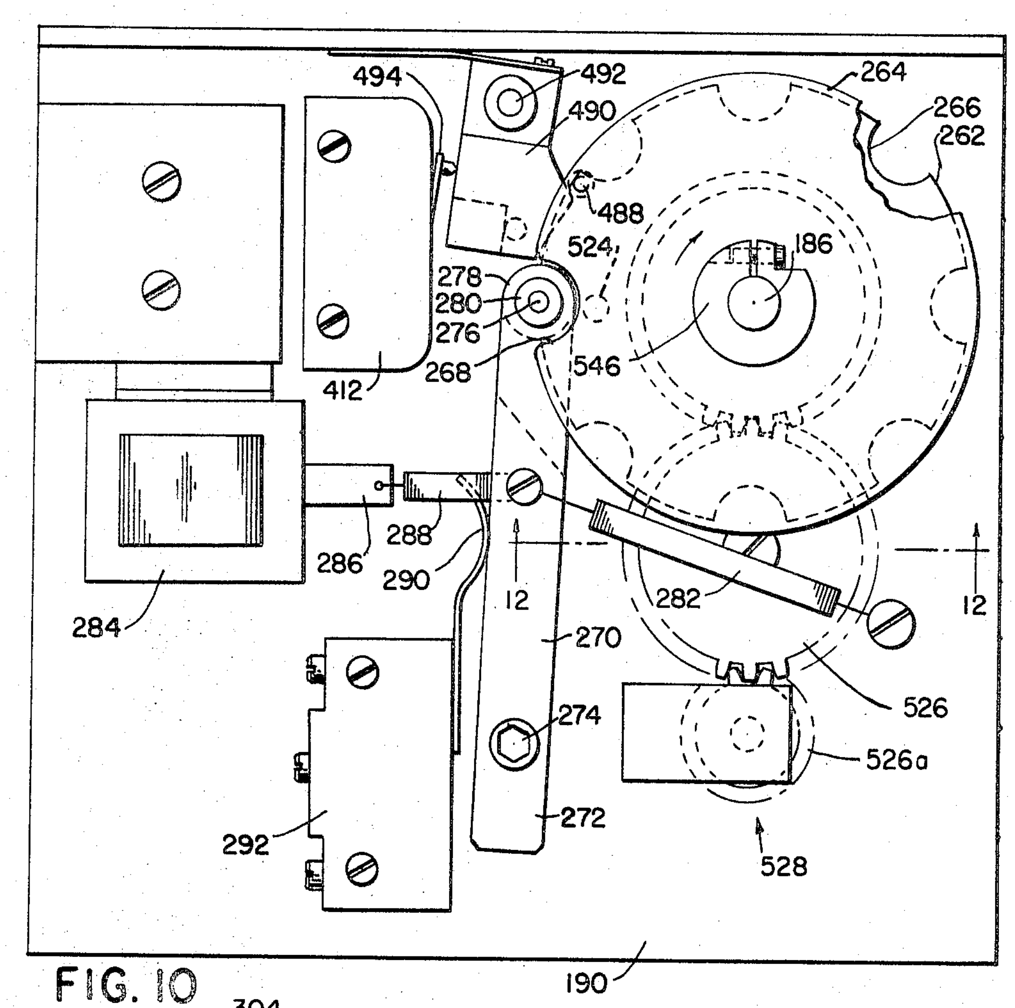
FIG. 10, on the sheet with FIGS. 12 and 15, is a plan view taken along the line 10–10 of FIG. 2, showing details of a means for indexing the film support assembly in a direction which is perpendicular to the base of the camera.
Figure 12:
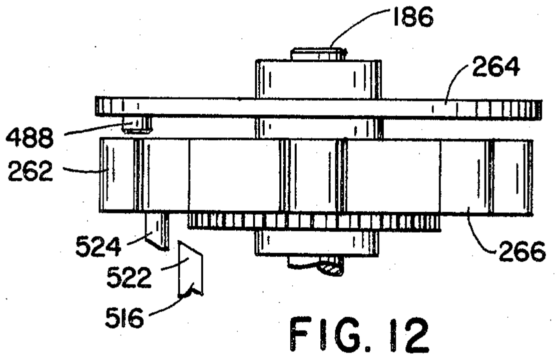
FIG. 12, on the sheet with FIGS. 10 and 15, is an elevational view of the structure shown in FIG. 10 and is taken along the line 12–12 thereof.

The control means for controlling the rotation of the vertical lead screw 186 are shown principally in FIGS. 2, 10, and 12. The control means include a detent wheel 262, which is fixed to the lead screw 186 to rotate therewith, and a programming plate 264, which also is similarly fixed to the lead screw 186. The detent wheel 262 has recesses 266 equally spaced around the periphery thereof, so that the angular distance that the wheel 262 rotates from one recess 266 to the next adjacent recess (relative to a fixed point near the periphery of the wheel 262) represents the smallest incremental advance that the film support assembly 60 will be moved up or down (as viewed in FIG. 1). To provide flexibility, the programming plate 264 is provided with recesses 268 in its periphery. In the embodiment shown in FIG. 10, only one recess 268 is shown. The detent wheel and the programming plate 264 cooperate in the same manner as do the detent wheel 142 and the programming plate 148 (shown principally in FIGS. 5 and 6) utilized for the horizontal lead screw 110.

The detent wheel 262 and the programming plate 264 (FIGS. 2, 10, and 12), which are part of the control means for controlling the rotation of the lead screw 186, cooperate with a control lever 270 as follows. The control lever 270 has one end 272, which is pivotally joined to the plate 190 by a fastener 274. The other end of the lever 270 has a shaft 276 secured thereto, on which rollers 278 and 280 are rotatably mounted and retained. The roller 278 engages the periphery of the detent wheel 262, and the roller 280 engages the periphery of the programming plate 264. Because the detent wheel 262 and the programming plate 264 rotate together, and because the rollers 278 and 280 are mounted on the same shaft 276 on the control lever 270, the roller 278 drops into a recess 266 on the detent wheel 262 only when the roller 280 drops into a recess 268 on the programming plate 264. The recess 268 is aligned with a recess 266 on the detent wheel 262. A spring 282 has one end secured to the plate 190 and its other end secured to the control lever 270 to resiliently urge the rollers 278 and 280 against the peripheries of the detent wheel 262 and the programming plate 264, respectively. When the rollers 278 and 280 lie in the recesses 266 and 268, respectively, the lead screw 186 is locked against rotation, and the film support assembly 60 is also locked against movement in an up-and-down direction as viewed in FIG. 1. To move the film support assembly 60 either up or down, a solenoid 284 (FIG. 10) is energized by the circuit control means (shown in FIG. 9 and to be described later), and its operating arm 286 is pulled inwardly of the solenoid. As the arm 286 is pulled inwardly, it pulls a spring 288, which is connected to the midpoint of the control lever 270, to pivot the lever 270 (counterclockwise as viewed in FIG. 10) about its lower end, thereby pulling the rollers 278 and 280 out of engagement with their associated recesses 266 and 268, respectively, enabling the lead screw 186 to be rotated. As the control lever 270 is rotated counterclockwise, it moves an arm 290, which actuates a switch 292 secured to the plate 190. The actuation of the switch 292 is effective to energize the motor 204 (FIGS. 1 and 2) to rotate the lead screw 186 in one direction or the other. The direction of the motor 204 is controlled by the circuit control means of FIG. 9, previously alluded to. After the motor 204 begins to rotate the lead screw 186, the solenoid 284 is deenergized, and the rollers 278 and 280 ride on the peripheries of the detent wheel 262 and the programming plate 264, respectively, until the plate 264 makes a complete revolution (in the embodiment shown in FIG. 10) and the rollers 278 and 280 again drop into their respective recesses to stop the rotation of the lead screw 186. As the control lever 270 begins to pivot clockwise due to the rollers 278 and 280 dropping into their associated recesses, the lever 270 moves away from the arm 290, thereby opening the switch 292 to deenergize the motor 204 to complete one indexing of the film support assembly 60 in a vertical direction. There is additional structure relating to the means for indexing the film support assembly in a vertical direction, which will later be described in conjunction with the control circuit shown in FIG. 9.

In order to better support the film support assembly 60 for the precise indexing required when the indexing means 20 is used with photochromic materials, a torsion bar means having the following construction is used. A torsion bar 294 (FIGS. 1 and 2), which is tubular and circular in cross section, has one end thereof welded to one end of a plate 296. The remaining end of the plate 296 is pivotally joined to an arm 298 of the bracket 224 by a fastener and special bearing 300 (to be later described). The remaining end of the torsion bar 294 has one end of a plate 302 welded thereto, as shown in FIG. 1. The other end of the plate 302 is adjustably connected to one end of a second plate 304 by a fastener 305. The remaining end of the plate 304 is pivotally joined to an arm 306 of a bracket 308 by a fastener and special bearing 307 (to be described later). The bracket 208 is secured to the second slide member 50. The torsion bar 294, which is made of cold drawn steel, is also supported by two plates 310 and 312. One end of the plate 310 is pivotally joined to an L-shaped bracket 314 (which is secured to the base 28) by a fastener and special bearing 316 (to be later described). The remaining end of the plate 310 is pivotally joined to one end of the torsion bar 294 by a self-centering bearing 318 to be later described. Similarly, one end of the plate 312 is pivotally joined to an L-shaped bracket 320 (which is secured to the base 28) by a fastener and special bearing 322 (to be later described). The remaining end of the plate 312 is pivotally joined to the remaining end of the torsion bar 294 by a self-centering bearing 324, similar to the bearing 318. With the film support assembly 60 in the position shown in FIG. 1, the fastener 305 is loosened, and the torsion bar 294 is rotated clockwise (as viewed in FIG. 2) slightly to take up any looseness or play which may be present in the plates associated therewith. The fastener 305 (flG. 1) is then tightened to secure the plates 302 and 304 together. The plates 310, 312, 296, 302, and 304 are all so dimensioned as to enable the torsion bar 294 to be positioned parallel to the film plane 22. As the film support assembly 60 is moved to the left from the position shown in FIG. 1, the torsion bar means assists in maintaining parallel movement of the assembly 60 relative to the base 28. To help support the film support assembly 60 when it is moved from the position shown in FIG. 1 to a position in which it is near to the second slide member 50, a conventional constant tension spring 326 is used. The spring 326 is secured to the cross bar 46, and its extensible end 328 is secured to the second slide member 50. The spring 326 also assists in raising the film support assembly 60 when it is moved upwardly as viewed in FIG. 1.

Figure 13:
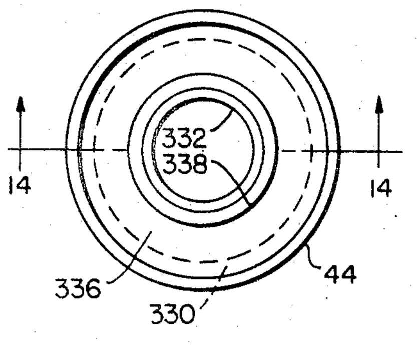
FIG. 13, on the sheet with FIGS. 11 and 14, is a plan view of a special bearing used in the invention.
Figure 14:
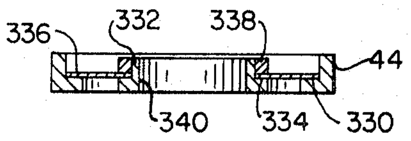
FIG. 14, on the sheet with FIGS. 11 and 13, is a cross-sectional view taken along the line 14–14 of FIG. 13, showing additional details of the special bearing.

Some additional construction details of the indexing means 20 are as follows. FIGS. 13 and 14 show the details of the special bearings 44, 54, and 58, shown principally in FIG. 1. Because these bearings 44, 54, and 58 are identical, a description of only the bearing 44 follows. The bearing 44 includes an outer ring, having a shoulder 330 in one side thereof, as shown in FIG. 14, and an inner ring 332, which also has a shoulder 334 formed thereon as shown. A flat washer-type diaphragm 336 is so dimensioned as to fit between the inner and outer rings of the bearing 44 and rest upon the shoulders 330 and 334. In the embodiment shown, the diaphragm 336 is made of beryllium copper and is about 0.008 of an inch thick. The outer perimeter of the diaphragm 336 is welded to the shoulder 330, and the inner perimeter of the diaphragm is retained on the shoulder 334 by a press-fitted sleeve 338. The internal diameter 340 of the inner ring 332 provides a snug fit with its associated rod member. For example, the internal diameter 340 of the bearing 44 fits snugly around the outside diameter of the rod 38, shown in FIG. 1. Because the lower end of the rod 38 (as viewed in FIG. 1) is fixed to the bar 30, as previously explained, the rod 38 may expand in an axial direction upwardly in the bearing 44 to allow for different rates of expansion between it and the rest of the structure supporting the film support assembly 60. The outer ring of the bearing 44 is secured to the under side of the cross bar 46 (FIG. 1) by fasteners not shown. The other bearing 44 in FIG. 1 is similarly secured to the under side of the crossbar 46 and has the rod 42 mounted therein, as was done with the rod 38. The bearing 58, in which the rod 56 is mounted, is secured to the second slide member 50, and the bearing 54 is secured to the first slide member 48, as shown in FIG. 1. Locating the bearings 58 and 54 on opposite ends of their respective rods 56 and 52 in this manner minimizes any twisting of the film plane 22.

Figure 8:
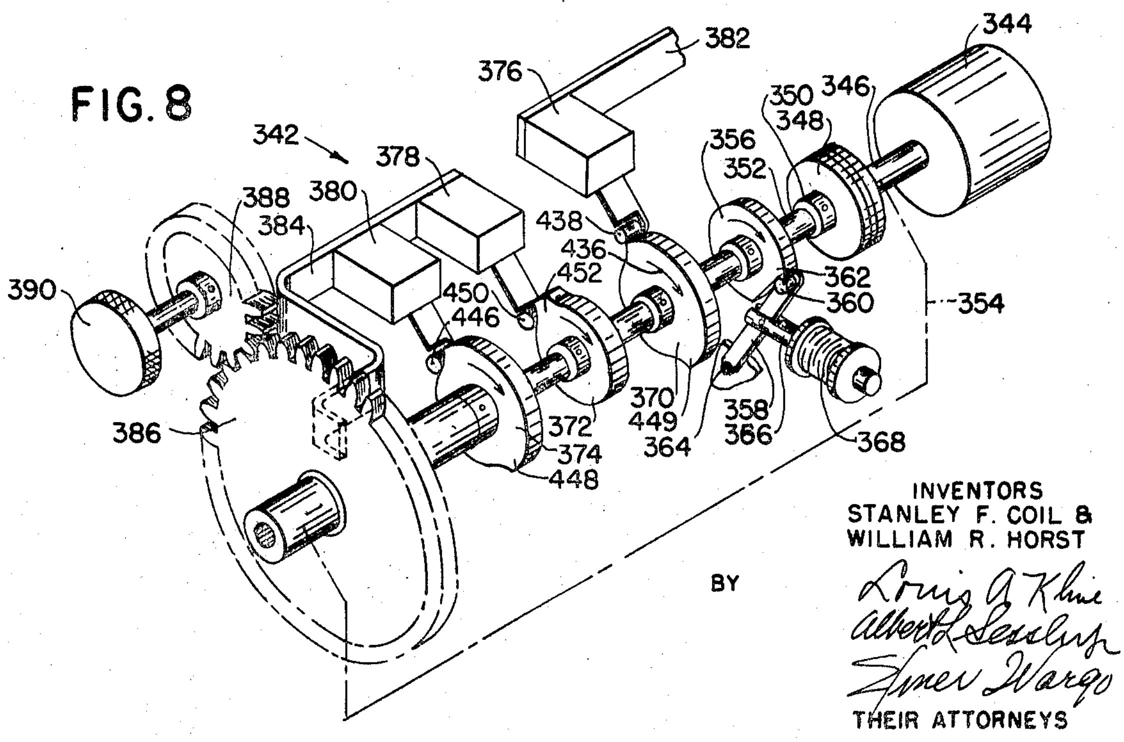
FIG. 8, on the sheet with FIG. 7A, is a view in perspective of a cam line used with a control circuit shown in FIG. 9 for controlling the indexing of the film support assembly in directions which are parallel to the camera base and perpendicular thereto.
Figure 9:
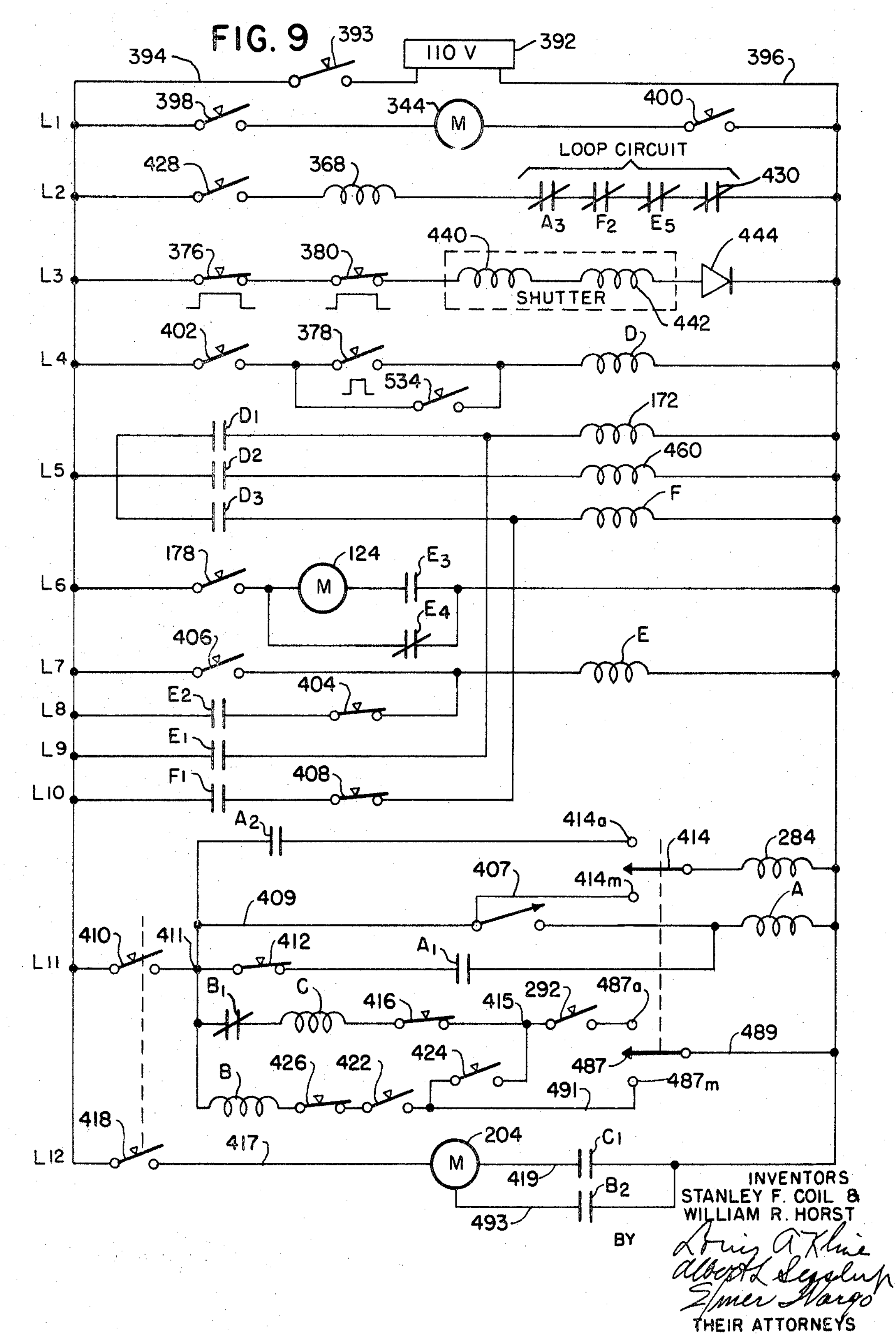
FIG. 9 is a diagrammatic view of the control circuit for the invention.

FIG. 8 shows a timing means 342 including several switched which are operatively connected to the circuit means shown in FIG. 9. The timing means 342 include a constant speed motor 344, whose output shaft 346 drives or rotates a conventional slip clutch 348. The output member 350 of the clutch 348 drives a cam shaft 352. The motor 344 and the cam shaft 352 are supported on conventional support structure represented only by the dashed line 354. A first cam 356, which is pinned to the shaft 352, is used as a brake for the slip clutch 348. When the lever 358 is in the position shown in FIG. 8, a roller 360, pivotally joined to one end thereof, abuts against a shoulder 362 on the cam 356 to prevent the rotation of the shaft 352. The other end of the lever 358 is pivotally joined to the support structure by a fastener 364. An operating arm 366 of a solenoid 368 is pivotally joined to the lever 358 between its ends, as shown. When it is desired to let the motor 344 rotate the shaft 352, the solenoid 368 is energized to withdraw the arm 366, pulling the roller 360 out of engagement with the shoulder 362. A spring (not shown) in the solenoid 368 resiliently urges the roller 360 against the periphery of the cam 356 when the solenoid 368 is deenergized by circuitry to be later explained in connection with FIG. 9. The cams 370, 372, and 374 are all pinned to the shaft 352 to rotate therewith and are used to actuate the switches 376, 378, and 380, respectively, in a timed relationship to be later described. The switch 376 is supported on a bracket 382, secured to the support structure, and the switches 378 and 380 are secured to a bracket 384, which is secured to a gear 386. The gear 386 is rotatably mounted on the shaft 352 and is in mesh with a gear 388, which is rotatably mounted in a conventional support structure (not shown). By rotating a knob 390, which is fixed to the gear 388 to rotate it, the angular position of the switches 378 and 380 relative to the switch 376 may be changed. The function of the switches shown in FIG. 8 will be discussed in relation to the circuitry shown in FIG. 9.

Figure 11:
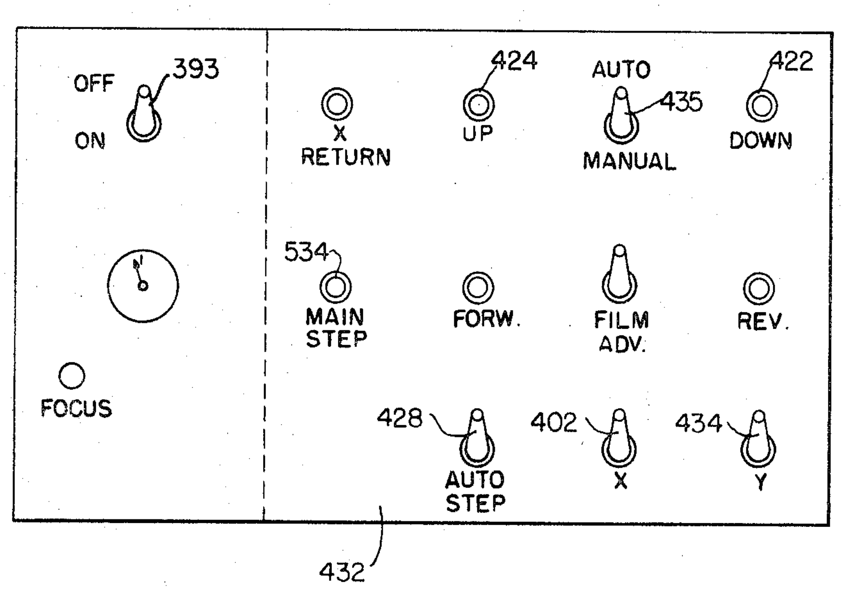
FIG. 11, on the sheet with FIGS. 13 and 14, is a front view of a control panel having control switches thereon which are used with the control circuit shown in FIG. 9.

The circuitry for controlling the operation of the indexing means 20 is shown primarily in FIG. 9, which includes an AC source 392 of electrical potential, a main power switch 393, and conductor lines 394 and 396 connected thereto as shown. To facilitate the explanation of the circuitry, the points L1 through L12 are shown connected to the conductor line 394, and these points will be used to locate the various components in the circuitry to be described. When the line switches 393, 398 (L1), and 400 are closed, the motor 344 (FIG. 8), which is connected to the lines 394 and 396 through these switches, begins to rotate; however, the cam shaft 352 does not rotate because the roller 360 abuts against the shoulder 263 on the cam 356. The slip clutch 348 permits the motor 344 to rotate while the shaft 352 is held stationary. Assume for the moment that the film support assembly 60 (shown in FIG. 1) is so positioned as to locate the first print position 26 at the optical axis or point 24. Assume further that the indexing means 20 is to be used in a recording camera with only its optical axis 24 shown in FIG. 1, and that the camera is to reduce 35millimeter size images recorded on a film strip to microimage sizes to be recorded on the film plane 22. The camera may be of the type shown in the U.S. Abbott et al. Pat. No. 3,260,153, previously mentioned. If it is desired to automatically reduce images from the film strip and record them on the film plane 22, the switch 428 at L2 in FIG. 9 and at the switch panel 432 in FIG. 11 should be closed. The power switch 402 (at L4 in FIG. 9 and at the switch panel 432) for operating the assembly 60 in a horizontal direction is also closed to operate the film support assembly 60 in a horizontal direction, and power switches 410 and 418 (at the points L11 and L12, respectively, in FIG. 9) are also closed to enable the film support assembly 60 to be moved in a vertical direction upon the completion of recording a horizontal line of images on the film plane 22. The switches 410 and 418 are ganged together to be operated from a common lever 435 (FIG. 11). The switch lever 435 is moved in the direction marked "AUTO" (for automatic operation) to close the switches 410 and 418 and is moved in the direction marked "MANUAL" to open these switches. Assume, also, that the film strip is properly positioned in said camera, and that an NC switch 430 at the point L2 is closed to verify this fact. The switch 430 is part of a loop circuit including normally closed switches $A_3$, $F_2$, and $E_5$, which circuit is in series with the solenoid 368 and the automatic step switch 428 (for indexing automatically in a horizontal direction) at the point L2.

Upon the closing of the switch 428 at the point L2 in FIG. 9, the following events occur. The solenoid 368 is energized to pull the arm 366 (FIG. 8) inwardly of the solenoid, pulling the roller 360 away from the shoulder 362 in the cam 356, thereby permitting the cam shaft 352 to be rotated by the motor 344. As the cam shaft 352 begins to rotate, the NC switch 376, which is open in the position shown in FIG. 8, closes just as soon as its associated cam 370 rotates in the direction indicated by the arrow 436 to permit its associated roller 438 to follow a fall on the cam. The switch 376 is connected to the line 394 at the point L3 in FIG. 9 and is in series with a normally closed switch 380 (FIG. 8). When the switch 376 is closed, it energizes a pair of series-connected shutter solenoids 440 and 442, which are associated with the camera (not shown) with which the indexing means 20 is used. The solenoids 440 and 442 may be part of a conventional "Ledex" shutter, in which each solenoid actuates one of a pair of shutter blade halves to open the shutter. A conventional diode 444, connected to the line 396, is placed in series with the solenoid 442 and the conductor line 396 to provide a DC current for the shutter solenoids. The switch 380 is normally closed in the position shown in FIG. 8 and remains closed as the cam shaft 352 begins to rotate. As long as the switch 380 remains closed, the shutter solenoids 440 and 442 remain energized, and the associated shutter blade halves (not shown) remain open. As the cam shaft 352 continues to rotate in the direction shown by the arrow 436 in FIG. 8, a roller 446, associated with the actuator arm of the switch 380, rides on the low part of the cam 374 until it meets a rise portion 448 thereon. When the roller 446 meets the rise portion 448, the NC switch 380 is opened to break the circuit to the shutter solenoids 440 and 442, thereby closing the shutter. The elapsed time between the closing of the switch 376 and the opening of the switch 380 represents the exposure time for said shutter. The exposure time is conventionally determined by the speed of the motor 344 (FIG. 8) and the geometry of the cams 370 and 374, and is dependent upon the particular recording media used. When photochromic materials are used on the film plane 22, the speed of the motor 344 is 60 r.p.m., and the elapsed time is typically 500 milliseconds for exposing said photochromic materials. This elapsed time can be varied somewhat by rotating the knob 390, which changes the angular relationship of the switches 378 and 380 relative to the switch 376, as previously explained. When the knob 390 is rotated clockwise, as viewed in FIG. 8, the gear 386 and the bracket 384 (on which the switches 378 and 380 are mounted) are rotated counterclockwise to reduce the elapsed time, and vice versa. After the switch 380 is opened to break the circuit to the shutter solenoids 440 and 442, continued rotation of the cam shaft 352 in the direction of the arrow 436 enables the roller 438 associated with the actuator arm of the NC switch 376 to ride up a rise portion 449 on the cam 370 to open the switch 376. As the cam shaft 352 continues to rotate, a roller 450 on the switch arm of the switch 378 strikes a node 452 (FIG. 8) on the cam 372 to thereby momentarily close the normally open switch 378 (hereinafter described as NO switch). The closing of the switch 378 is utilized to initiate the indexing of the film support assembly 60 in a horizontal direction, and the closing occurs a sufficient time after the opening of the switch 380 to insure that the shutter associated with the solenoids 440 and 442 is completely closed prior to any movement of the film support assembly 60. The closing of the switch 378 (FIG. 8) is also utilized to deenergize the solenoid 368 (by means to be described later), permitting a spring therein to push the arm 366 outwardly of the solenoid, enabling the roller 360 to engage the shoulder 362 on the cam 356 and to stop the rotation of the cam shaft 352 at the position shown in FIG. 8. When the cam shaft 352 is in the position shown in FIG. 8, the switches 380 and 378 are closed, and the switch 376 is open.

As previously stated, the momentary closing of the switch 378 when it encounters the node 452 on the cam 372 (FIG. 8) is effective to initiate the indexing of the film support assembly 60 (FIG. 1) in a horizontal direction as follows. When the NO switch 378 is momentarily closed, the relay D is energized, and its three normally open switches $D_1$, $D_2$, and $D_3$ are closed. Each of these three switches has one terminal connected to the point L5 of the conductor line 394, as shown in FIG. 9. When the switch $D_1$ is closed, the solenoid 172 (FIG. 5), in series with the switch $D_1$ and the conductor line 396, is energized, pulling its operating arm 170 inwardly of the solenoid and pivoting the control lever 152 clockwise (as viewed in FIG. 5) about the fastener 156, as previously explained. While pivoting, the lever 152 closes the switch 178, which has one terminal thereof connected to the line 394 at the point L6 (FIG. 9), with its other terminal connected to the motor 124. When the switch 178 is closed, the reversible motor 124 is energized through a series-connected NC switch E 4 associated with the relay E, and rotates the detent wheel 142 and the programming plate 148 counterclockwise (as viewed in FIG. 5). The switch $E_4$ is connected to the forward direction terminal of the motor 124 and the line 396. When the NO switch $D_3$ is closed upon the energization of the relay D, the relay F (in series with the switch $D_3$ and the conductor line 396, FIG. 9) is also energized. Energization of the relay F closes its associated NO switch $F_1$, which is connected to the point L10 on the conductor line 394. The switch $F_1$ provides a holding circuit for the relay F through an NC switch 408 in series therewith. As the detent wheel 142 and the programming plate 148 are rotated counterclockwise from the position shown in FIG. 5, a pin 454, located on the plate 148, engages a cam member 456 (which is pivotally mounted on the vertical support 106 by a fastener 458) and rotates it counterclockwise (as viewed in FIG. 5) to actuate the NC switch 408 to open it momentarily. The opening of the switch 408 breaks the holding circuit through the NO switch $F_1$, and the relay F is deenergized. The relay D is energized only momentarily by the action of the node 452 on the cam 172 closing the NO switch 378 (FIG. 8) in series therewith; however, it is energized long enough to permit the solenoid 172 to be energized long enough (via the closing of the switch $D_1$) to withdraw the rollers 164 and 162 out of the recesses 150 and 146 in the programming plate 148 and the detent wheels 142, respectively, enabling said plate and said wheel to be rotated. Upon the opening the NO switch 378, the relay D is deenergized (via the opening of the NO SWITCH $D_1$), and the solenoid 172 is thereafter deenergized, permitting the spring 180 (FIG. 5) on the control lever 152 to pull the rollers 164 and 162 into the next ones of said recesses 150 and 146, respectively. As the rollers 164 and 162 fall into their respective said recesses, the switch 178 is opened to deenergize the motor 124, thereby completing the indexing of the film support assembly one print position (to the right as viewed in FIG. 1).

During the time that the indexing of the film support assembly 60 is being effected, the NC switch $F_2$, associated with the relay F (FIG. 9), was opened to prevent exposure of the photochromic material at the film plane 22. Also, during said indexing (when the relay D was energized), the NO switch $D_2$ associated therewith was closed to complete a circuit from the point L5 of FIG. 9 to a film advance solenoid 460 in series with the switch $D_2$ and with the conductor line 396. The solenoid 460 controls conventional circuitry (not shown) for advancing the film in the camera with which this indexing means 20 may be used. The film-advancing mechanism may be conventional, and, because it does not form a part of this invention, it is not shown or described herein. It is sufficient to state that, when the film advancing is completed, the switch 430 (FIG. 9) is closed to verify the fact that the film advancing has been effected. As previously stated, the switch 430 is part of a loop circuit which prevents energization of the solenoid 368 (FIG. 9) until certain conditions are met. The solenoid 368 controls the exposure of the photochromic material at the film plane 22. Because the automatic indexing switch 428 has been closed to obtain automatic indexing, the solenoid 368 is energized again as soon as the switch 430 is closed. The solenoid 368 (FIGS. 8 and 9) will again be energized to expose the next area presented by the film support assembly 60 (FIG. 1), and the assembly will again be indexed one print position to the right (as viewed in FIG. 1), as previously stated.

This automatic indexing of the film support assembly 60 in a horizontal direction and to the right as viewed in FIG. 1 is repeated as described until the assembly reaches the rightmost position shown in FIG. 1. Upon approaching this position, the plate 236 (FIGS. 7A and 7B) strikes a stop 462, which is adjustably secured to a bar 464. The bar 464 is slidably mounted on the channel member 120 in guides 466 and 468 for horizontal movement (as viewed in FIG. 1). When the plate 236 strikes the stop 462, the bar 464 is moved towards the vertical support 108 and moves an actuator arm 470 on the NO reversing switch 406 to close it. The switch 406 has one terminal connected to the conductor line 394 at the point L7 (FIG. 9), and the other terminal is connected to one terminal of the relay E, whose other terminal is connected to the conductor line 396. Closing of the switch 406 energized the relay E. which has five switches—namely, $E_1$, $E_2$, $E_3$, $E_4$, and $E_5$—associated therewith. The switch $E_1$ is normally opened and has one terminal connected to the conductor line 394 at the point L9 of FIG. 9 and its other terminal connected to the solenoid 172. When the relay E is energized, the switch $E_1$ becomes closed to energize the solenoid 172 (FIG. 9). Energization of the solenoid 172 keeps the rollers 164 and 162 (FIG. 5) out of their associated recesses in the programming plate 148 and the detent wheel 142, as previously explained, permitting the motor 124 to rotate the horizontal lead screw 110 when the motor is energized. The switch $E_2$ of the relay E is normally open and has one terminal connected to the line 394 at the point L8, and its other terminal is connected to one terminal of an NC switch 404, whose remaining terminal is connected to the relay E. The switches $E_2$ and 404 provide a holding circuit for the relay E. Because the switch 178 at the point L6 (FIG. 9) is closed when the solenoid 172 (FIG. 5) is energized, the motor 124 is energized to run in the opposite direction due to the simultaneous closing of the NO switch $E_3$ (FIG. 9) and the opening of the NC switch $E_4$ when the relay E is energized. Energization of the motor 124 to run in reverse causes the film support assembly 60 to be moved horizontally to the left as viewed in FIG. 1. To prevent any exposure of the photochromic material at the film plane 22 during the return of the film support assembly 60 to the home position, the NC switch $E_5$ in the loop circuit (FIG. 9) is opened when the relay E is energized.

During automatic returning of the film support assembly 60 in a horizontal direction, the following events occur as the assembly 60 is moved to home position (to the left as viewed in FIG. 1). As the film support assembly 60 moves to the left, the plate 236 strikes a stop 472 (FIG. 7B), which is adjustably secured to the bar 464 to move the bar to the left as viewed in FIG. 1. Movement of the bar 464 to the left also pushes a rod 474 to the left. The rod 474 has a slot 476 (FIG. 7A) therein, in which slot a fastener 478 is fastened. The fastener 478 is secured to the channel member 120, and the slot 476 enables the rod 474 to be moved in a direction parallel to the bar 464 and to be pivoted about the fastener 478. The left vertical support 106 has therein a slot 480, which permits the end 482 of the rod 474 to pass therethrough and to pivot about the fastener 478. As the rod 474 is pushed to the left, as viewed in FIG. 1, its end 482 engages a projection 484 (FIG. 7A) located on the detent wheel 142 near its periphery. When the film support assembly 60 is returning to the home position, the detent wheel 142 is rotating clockwise (as viewed in FIG. 5), so that the projection 484 strikes the end 482 of the rod 474 and pivots counterclockwise (as viewed in FIG. 7A) about the fastener 478. Counterclockwise pivoting of the rod 474 causes an arm 486, secured to the rod, to actuate the switches 404 and 407 (FIGS. 7A and 9). The switch 404 is normally closed and is opened by the movement of the rod 474 when the detent wheel 142 and the programming plate 148 have rotated clockwise (as viewed in FIG. 5) a portion of a revolution beyond the home position. As a result, the rollers 164 and 162 on the control lever 152 are riding on the peripheries of the plate 148 and the detent wheel 142, respectively, instead of stopping in the appropriate recesses 150 and 146, thereby causing the control lever 152 to keep the switch 178 closed. When the switch 404 is opened, the holding circuit (at the point L8, FIG. 9) for the relay E is interrupted, causing deenergization of the relay E. Deenergization of the relay E causes the NO switch $E_3$ to be opened and the NC switch $E_4$ to be closed. With the switch 178 at the point L6 still closed by the control lever 152, the motor 124 not rotates to move the film support assembly 60 in the direction of normal indexing through the now closed NC switch $E_4$. The motor 124 rotates the programming plate 148 and the detent wheel 142 in the normal indexing direction (counterclockwise as viewed in FIG. 5) until the rollers 164 and 162 fall into the next approaching recesses 150 and 146, respectively, causing the lever 152 to move away from the switch 178, thereby opening it to deenergize the motor 124. This technique of turning the horizontal lead screw 110 beyond the home position on the return movement of the film support assembly 60 and then rotating it in the normal indexing direction (counterclockwise as viewed in FIG. 5) provides for an accurate alignment of the film support assembly 60 at the first print position. A spring 475 is used to pivot the rod 474 clockwise (as viewed in FIG. 7A) to the position shown therein. When the bar 464 moves away from the support 106 as the film support assembly moves to the right (as viewed in FIG. 1), the switch 407, which also was actuated when the film support assembly 60 approached the home position on its return movement, accomplished the following. The switch 407 (FIG. 7A) is normally open and is momentarily closed when actuated by the movement of the rod 474. The closing of the switch 407 energizes the relay A (FIG. 9), which has switches $A_1$, $A_2$, and $A_3$ associated therewith. The switch 407 has one terminal which is connected to one end of the relay A, whose remaining end is connected to the conductor line 396. The remaining terminal of the switch 407 is connected to a conductor 409, which is connected to one terminal 411 of the switch 410. The remaining terminal of the switch 410 is connected to the conductor line 394 at the point L11 in FIG. 9. When the relay A is energized, the normally open switch $A_1$ becomes closed to set up a holding circuit for the relay A in cooperation with the normally closed switch 412 in series therewith. The normally open switch $A_1$ has one terminal connected to the same end of the relay A as the switch 407, and the remaining terminal of the switch $A_1$ is connected to one terminal of the switch 412. The remaining terminal of the switch 412 is connected to the terminal 411. The normally open switch $A_2$ has one terminal connected to the terminal 411 of the switch 410 and the other terminal connected to the terminal 414*a* as shown in FIG. 9. When the lever 435 in FIG. 11 is moved to the position marked "AUTO.," the switch lever 414 engages the contact 414*a*, and, when the lever 435 is moved to "MANUAL", the switch lever 414 engages the contact 414*m*. The lever 414 is connected to one end of the solenoid 284, whose remaining end is connected to the conductor line 396. When the switch $A_2$ is closed upon the energization of the relay A, and with the lever 435 in the "AUTO." position, the solenoid 284 (FIGS. 9 and 10) is energized.

The mechanical structure used for indexing the film support assembly 60 in the vertical direction (as viewed in FIG. 1) is similar to that employed in indexing the assembly in a horizontal direction, and the indexing generally begins with the energization of the solenoid 284, which was effected by the energization of the relay A. When the solenoid 284 is energized, its arm 286 resiliently pulls the control lever 270, so as to pivot it counterclockwise (as viewed in FIG. 10) about the fastener 274. Pivoting of the lever 270 in this manner pulls the rollers 280 and 278 out of their associated recesses 268 and 266 in the programming plate 264 and the detent wheel 262, respectively, and also closed the motor switch 292. The switch 292 is normally open and has one terminal connected to the terminal 487*a*, as shown in FIG. 9. When the lever 435 in FIG. 11 is moved to the position marked "AUTO.," the switch lever 487 engages the contact 487*a*, and, when the lever 435 is moved to "MANUAL," the switch lever 487 engages the contact 487*m*. The lever 487 is connected to the conductor line 396 by a conductor 489. The switch levers 414 and 487 are ganged together to be simultaneously operated by the lever 435. With the switch lever 487 engaging the contact 487*a*, and with the motor switch 292 closed, the relay C is energized. As shown in FIG. 9, the remaining terminal of the switch 292 is connected to one terminal 415 of a switch 416, whose remaining terminal is connected to one end of the relay C. The remaining end of the relay C is connected to one terminal of a normally closed switch $B_1$, associated with the relay B. The remaining terminal of the switch $B_1$ is connected to the terminal 411 of the switch 410. With the switches 292 and 416 closed, the relay C is energized, and its sole associated NO switch $C_1$ becomes closed to energize the reversible motor 204. The motor 204 has its common line 417 connected to one terminal of the switch 418, whose remaining terminal is connected to the line 394 at the point L12. The forward direction line 419 (FIG. 9) of the motor 204 is connected to one terminal of the switch $C_1$, whose remaining terminal is connected to the conductor line 396.

When the motor 204 is energized to rotate the vertical lead screw 186, the following events occur. For normal automatic indexing of the film support assembly 60 in the vertical direction (upwardly as viewed in FIG. 1), the programming plate 264 and the detent wheel 262 are rotated clockwise (as viewed in FIG. 10). In the embodiment shown in FIG. 10, the programming plate 264 has only one recess 268 on its periphery, although this can be readily changed to suit specific incremental advance requirements. The rollers 280 and 278 ride on the peripheries of their associated programming plate 264 and detent wheel 262, respectively, in FIG. 10, and, when they rotate far enough, the roller 280 is urged into the recess 268 by a tension spring 282 connected to the control lever 270, and the roller 278 is similarly urged into the recess 266 on the detent wheel 262, which recess is aligned with the recess 268. The lever 270, in pivoting clockwise, as viewed in FIG. 10, accordingly permits the switch 292 to open to deenergize the relay C. With the relay C deenergized, the switch $C_1$ associated therewith opens, and the motor 204 is deenergized to complete the indexing of the film support assembly 60 in the vertical direction. Just before the rollers 280 and 278 are urged into their respective recesses 268 and 266, a pin 488 on the programming plate 264 engages a cam member 490 pivotally mounted on the plate 190 by a fastener 492 and pivots the cam member clockwise as viewed in FIG. 10. When so moving, the cam member 490 moves an arm 494 connected to the switch 412 to open it momentarily. The momentary opening of the switch 412 breaks the holding circuit of the relay A (FIG. 9), thereby deenergizing it. After the deenergization of the relay A, further rotation of the programming plate 264 to an indexed print position (that is, when the roller 280 lies in the recess 268) permits the cam member 490 to pivot counterclockwise and thereby permit the switch 412 to be reclosed. During the time that the relay A was energized, its associated normally closed switch $A_3$ (FIG. 9) was opened in the loop circuit to prevent exposure at the film plane 22 during indexing of the film support assembly 60. The deenergization of the relay A permits its associated NC switch $A_3$ to close, thereby completing the loop circuit in series with the solenoid 368 to energize it, causing the cam shaft 352 to be rotated by the motor 344 (FIG. 8), as previously explained. Automatic indexing in the horizontal direction will be initiated and another line of printing in the horizontal direction will be completed, whereupon the film support assembly 60 will be returned to the home position (to the left as viewed in FIG. 1) and then automatically indexed upwardly one print line.

The automatic indexing of the film support assembly 60 is repeated until the last line available for printing in the horizontal direction (as viewed in FIG. 1) is completed. Upon completion, the film support assembly 60 is returned to the home position (in a horizontal direction), and the switches 404 and 407 are actuated as previously explained to set up the controls for indexing the assembly 60 in a vertical direction; that is, the relay A is energized (FIG. 9), resulting in the energization of the solenoid 284 and the closing of the switch 292 associated with the control lever 270. The closing of the switch 292 is effective to energize the motor 204 to raise the assembly 60 in a vertical direction (as viewed in FIG. 1). As soon as the film support assembly 60 begins to move upwardly, a pin 496, located on the bracket 224 (FIG. 1) engages a stop 498, which is adjustably secured to a rod 500. The rod 500 is positioned vertically to the base 28 and is slidably mounted on the vertical tube 208 in guides 502 and 504. As the pin 496 moves upwardly (as viewed in FIG. 1), the stop 498 and the rod 500 also are pushed upwardly, enabling the upper end of the rod to actuate the switch 416, which is mounted on the vertical tube 208. The switch 416 is a normally closed switch, and, when it is actuated, it is opened to deenergize the relay C (FIG. 9). When the relay C is deenergized, its associated NO switch $C_1$ becomes opened, and the motor 204 ceases to rotate to prevent it from making the usual complete rotation clockwise (as viewed in FIG. 10), so that the pin 488 on the programming plate 264 will not have reached the position shown in FIG. 10. In this position of incomplete rotation, the pin 488 will not have rotated far enough to engage the cam member 490, so the NC switch 412 will still be closed. When the switch 412 is closed, the holding circuit for the relay A keeps the relay energized, thereby keeping the NC switch $A_3$ opened in the loop circuit to prevent exposure at the film plane 22. With the switch 416 opened, the film support assembly 60 will remain at the upper limit of its travel (as viewed in FIG. 1) and will not be lowered or indexed to the home position automatically. With the film support assembly 60 at the upper limit of its travel (FIG. 1), the film plane 22 may be conveniently removed from the assembly and a new film plane inserted therein, as previously explained.

After a new film plane 22 is inserted into the film support assembly 60 (FIG. 1) and it is desired to lower the assembly 60 to the starting position for recording or reading, the switch lever 435 (FIG. 11) is moved to the position marked "MANUAL," and the push button 422 marked "Down" is depressed. When the lever 435 is moved to "MANUAL," the switch lever 414 (FIG. 9) is moved from the contact 414*a* to the contact 414*m*, and the switch lever 487 is moved from the contact 487*a* to the contact 487*m*. When engaging the contact 414*m*, the lever 414 completes an energizing circuit to the solenoid 284 over the conductor 409 to the terminal 411 of the switch 410. With the solenoid 284 energized, the motor switch 292 is kept closed, enabling the vertical lead screw 186 (FIG. 10) to be rotated in either direction. When the switch lever 487 (FIG. 9) engages the contact 487*a*, and with the "Down" push button 422 depressed, a circuit is completed to energize relay B, the reversing relay. The relay B has one end connected to the terminal 411 of the switch 410 and its other end connected to one terminal of a switch 426 (also shown in FIG. 1). The remaining terminal of the switch 426 is connected to one terminal of the switch 422, while its other end is connected to the contact 487*m* by a conductor 491. A conductor line 493 for the reversing motor 204 is connected to it and one terminal of the switch $B_2$, whose remaining terminal is connected to the conductor line 396. When the relay B is energized, its associated switch NO $B_2$ is closed to complete a circuit to the motor 204 to reverse it.

As long as the lever 435 (FIG. 11) is in the position marked "MANUAL" and the "Down" push button switch 422 is closed, the film support assembly 60 travels in a downward direction (as viewed in FIG. 1) until it approaches the limit of its travel in that direction. As the assembly 60 approaches this limit, the pin 496 on the bracket 224 engages a stop 506, which is adjustably secured on the rod 500, and move said stop and rod in a downward direction. Near the upper end of the rod 500 (as viewed in FIG. 1), a lever 508 is pivotally mounted between its ends on a fastener 510, which is secured to the vertical tube 208. One end of the lever 508 has one end of a tension spring 512 secured thereto, while its other end is secured to the tube 208. The remaining end of the lever 508 fits into a recess 514 in the rod 500, which provides upper and lower shoulders therein, as viewed in FIG. 1. When the rod 500 is pushed downwardly (as viewed in FIG. 1) by the action of the pin 496, the end of the lever 508 in the recess 514 abuts against the upper shoulder therein, causing the lever 508 to pivot counterclockwise about the fastener 510. When so doing, the end of the lever 508 to which the spring 512 is attached pushes a rod 516 upwardly (as viewed in FIG. 1). The rod 516 is similar in construction and operation to the rod 474 shown in FIG. 7A. As shown in FIG. 1, the rod 516 has in one end thereof a slot 518, into which a fastener 520 is positioned to enable the rod 516 to be moved in a direction which is aligned with the rod 500 while at the time enabling the rod to be pivoted about the fastener 520, which is secured to the tube 208. As the rod 516 is pushed upwardly (as viewed in FIG. 1) by the counterclockwise pivoting action of the lever 508, its upper end 522 (FIG. 12) engages a projection 524 located on the detent wheel 262. As the wheel 262 rotates counterclockwise, as viewed in FIG. 10 (in lowering the film support assembly 60), it pivots the rod 516 clockwise (as viewed in FIG. 1) about the fastener 520. As the rod 516 pivots in said direction, it moves an actuator arm 525 on the NC switch 426, thereby opening the switch. When the switch 426 is opened, the relay B (FIG. 9) is deenergized, and the NO switch $B_2$ opens to deenergize the motor 204 to stop the rotation of the detent wheel 262 and the programming plate 264. The location of the switch 426 and its opening by the pivoting of the rod 516 are so arranged that the lead screw 186 is rotated so as to lower the film support assembly 60 below that necessary for accurate location at the first line of printing. When the lead screw 186 is in this position, the roller 280 rides on the periphery of the programming plate 264, thereby enabling the control lever 270 (FIG. 10) to keep the switch 292 closed. To raise the film support assembly 60 to the first print line, the lever 435 (FIG. 11) is moved to the automatic position, marked "AUTO.," thereby enabling the switch lever 487 to engage the contact 487*a* (FIG. 9). With the switch lever 487 on the contact 487*a*, and with the switch 292 closed by the control lever 270, the relay C will be energized to close its associated NO switch $C_1$ (FIG. 9). The closing of the switch $C_1$ energizes the motor 204 to rotate the programming plate 264 in the normal indexing direction (clockwise as viewed in FIG. 10), permitting the rollers 280 and 278 to be urged into the next approaching recesses 268 and 266, respectively, on said plate 264 and said detent wheel 262 to thereby permit the switch 292 to open. With the switch 292 opened, the relay C is deenergized, and its associated switch $C_1$ is opened to shut off the motor 204. The film support assembly 60 is now positioned at the first print position; that is, the point 26 (FIG. 1) coincides with the optical axis represented by the point 24.

If raising of the film support assembly 60 is desired by manual means, the lever 435 (FIG. 11) is moved to the position marked "manual" to connect the switch lever 487 (FIG. 9) to the contact 487*m*. The push button switch 424 (FIGS. 11 and 9) can then be depressed to close it, thereby connecting the line 396 with the terminal 415, which energizes the relay C and closes its associated switch $C_1$ to energize the motor 204 for rotation in the normal indexing direction. When the switch 424 is released, the motor 204 is deenergized upon the deenergization of the relay C. If the assembly 60 has been raised too high, the push button switch 422 may be closed to energize the relay B (FIG. 9), which closes the switch $B_2$ to lower the film support assembly 60.

The indexing means 20 may have a conventional counter gear system operatively connected to the lead screw 186 to indicate the position of the film support assembly 60 in a vertical direction, relative to the optical axis (FIG. 1). Because the counter gear system may be conventional, it is represented only by a coupling gear 526, the counter gear 526*a*, and the arrow or reading point 528 (FIG. 10). As the lead screw 186 is rotated, the counter gear 526*a* is accordingly moved to indicate, at the arrow 528, the pertaining print position which is positioned at the optical axis 24. A similar counter gear system may be employed to indicate the position of the film support assembly 60 in a horizontal direction relative to the optical axis 24. This gear system also may be conventional and is represented by a coupling gear 530, a counter gear 530*a* (with print positions thereon), and an arrow 532 (FIG. 5). The gear 530 is operatively connected to the horizontal lead screw 110 and rotates when the screw 110 rotates to show, at the arrow 532, the print position which is located at the optical axis 24.

The film support assembly 60 may be indexed manually in the horizontal direction by depression of a switch 534, located on the panel 432 (FIG. 11). The switch 534 is normally open and is in parallel with the switch 378 (FIG. 9). When the switch 534 is depressed and closed, the relay D is energized to initiate the indexing in the horizontal direction, as previously explained. Manual indexing is effected in the horizontal direction only in the direction of normal indexing, which is to the right as viewed in FIG. 1. Upon the film support assembly 60 reaching the rightmost position, it is returned to its home position automatically.

Figure 7B:
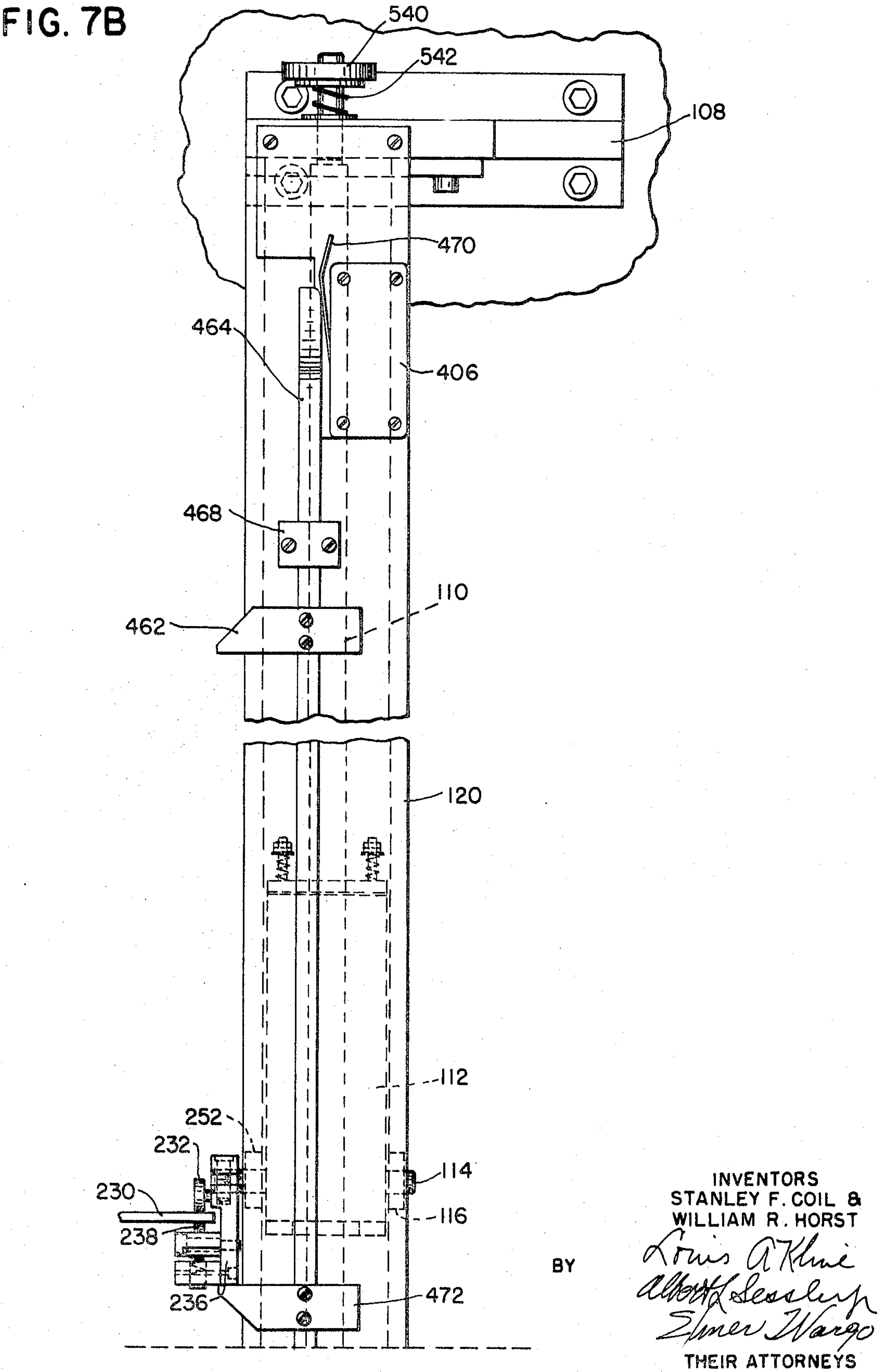

Some miscellaneous construction details are as follows. The horizontal lead screw 110 has a shoulder 536, which abuts against the vertical support 106 (FIGS. 7A and 7B). The end of the lead screw 110 shown has a collar 538 secured thereto to prevent axial movement of the shaft relative to the vertical support 106. The right end of the screw 110 (as viewed in FIG. 1) has a locking collar 540 secured thereto, which collar compresses a spring 542, which places some tension on the shaft to minimize any play therein. The vertical shaft 186 also has a shoulder 544 (FIG. 2), which abuts against the plate 194, and also has a locking collar 546 secured thereto to prevent axial movement of the shaft relative to the plate 194.

Figure 15:
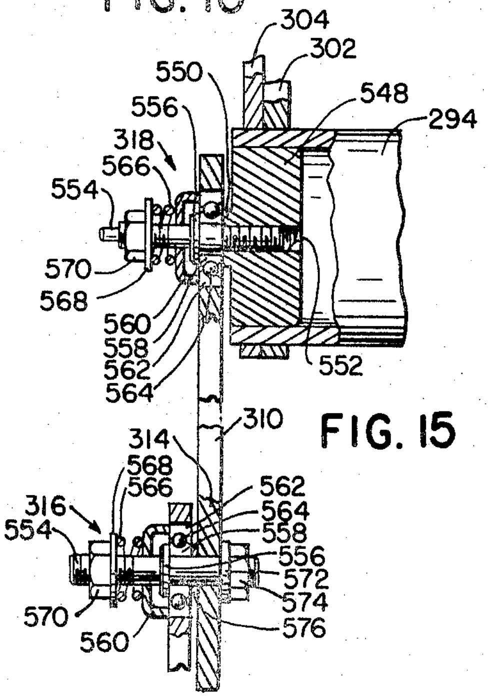
FIG. 15, on the sheet with FIGS. 10 and 12, is an enlarged elevational view of a portion of FIG. 1, showing the bearings used in mounting the torsion bar means.

The special bearings previously alluded to, which bearings are used in mounting the torsion bar 294, are constructed as shown in detail in FIG. 15. Because the bearings 318 and 324 (located in FIG. 1) are identical, a description of only bearing 318 will follow. The end of the torsion bar 294 has a circular plug 548 fixed therein, as shown in FIG. 15. The plug 548 has an annular face 550 extending from one side thereof, and the face and the plug are drilled and threaded at 552 along an axis which is coincident with the longitudinal axis of the torsion bar 294. A fastener 554, having a flange 556 integrally formed thereon, is used to secure the inner race 558 of a ball bearing to the face 550 when the fastener is threaded into the threads 552 of the plug 548. A cup-shaped washer 560 bears against the sidewall of an outer race 562 of a ball bearing, with the bearing balls 564 positioned between the inner and outer races. A compression-type spring 566 is positioned between the cup-shaped washer 560 and a flat washer 568. The outer end of the fastener 554 is threaded to receive a nut 570, which is used to resiliently urge the cup-shaped washer 560 against the outer race 562, which is located in a complementary opening in the plate 310. By this construction, the bearings 318 and 324 are made self-centering, so as to facilitate the movement of the torsion bar 294 in an up-and-down direction (as viewed in FIG. 1) while still maintaining the torsion bar parallel to the film plane 22.

The bearings designated generally as 300, 307, 316, and 322 in FIG. 1 are all identical and are all substantially the same as the bearing 318, just described; therefore, a description of only the bearing 316, shown in FIG. 15, will follow. Those components of the bearing 316 which are the same as the bearing 318 are numbered the same, and therefore a discussion of only the differences between these two bearings will be given. The fastener 570 is secured to the plate 310 by placing a washer 572 on the fastener 570 on the side of the plate 310 which is opposite to the side facing the inner and outer races 562 and 558, respectively. When a nut 574 on the fastener 570 is tightened, the bearing 316 is drawn towards the plate 310. A thin washer 576 is positioned between the bearing 316 and the plate 310 to provide clearance therebetween to effect the self-centering action mentioned.

We claim:

1. In a reducing camera having a base, an optical axis, and a film support assembly, the improvement comprising indexing means for moving said assembly in a plane which is perpendicular to said axis and for reciprocatingly moving said assembly within said plane along first and second lines at right angles to one another, said indexing means comprising:

a pair of spaced vertical supports perpendicular to and upstanding from said base;

a first slide member slidably mounted on one of said supports and a second slide member slidably mounted on the remaining said vertical support;

a pair of spaced parallel rods positioned perpendicularly to said vertical supports, with each said rod having one end thereof secured to said first slide member and the remaining end thereof secured to said second slide member;

said film support assembly being slidably mounted on said rods between said slide members so as to be reciprocatingly movable in sad plane along said first lines which are perpendicular to said vertical supports;

first indexing means operatively connected to said film support assembly for indexing said assembly on said parallel rods along said first lines;

second indexing means operatively connected to said first slide member for indexing said first slide member along one of said vertical supports, so as to index said assembly along said second lines; and torsion bar means operatively connected between said first slide member and said second slide member so as to assist in reciprocating said second slide member on its associated vertical support in parallel relationship with said first support.

2. The improvement as claimed in claim 1 in which said torsion bar means comprises a torsion bar having lever means adapted to place said bar in torsion in order to effect parallel movement of said second slide member relative to said first slide member as said first slide member is moved by said second indexing means.

3. The improvement as claimed in claim 2 further comprising a support member means positioned parallel to and spaced from said base for joining the ends of said vertical support members located away from said base; and a constant tension spring means having one end thereof secured to said support member means and the remaining end thereof secured to said second slide member.

4. The improvement as claimed in claim 3 in which each one of said ends of said vertical supports is joined to said support member means by a bearing means, said bearing means including an outer ring secured to said support member means, an inner ring in which the pertaining end of said vertical support is slidably mounted, and a metal diaphragm joining said inner and outer rings.

5. The improvement as claimed in claim 1 in which said torsion bar means comprises:

a torsion bar;

a first lever fixed at one end thereof to one end of said torsion bar, with the remaining end of said lever being pivotally joined to said first slide member;

a second lever fixed at one end thereof to the remaining end of said torsion bar, with the remaining end of said second lever being pivotally joined to said second slide member; and lever means pivotally joined to the ends of said torsion bar and pivotally joined to said base so as to maintain the longitudinal axis of said torsion bar in parallel relationship with said rods.

6. The improvement as claimed in claim 5 in which said torsion bar is tubular, and in which said second lever has adjustable means thereon for adjustably fixing the amount of torsion in said torsion bar between the ends thereof.

7. The improvement as claimed in claim 6 in which said lever means pivotally joining the ends of said torsion bar with said base include self-centering bearings.

8. The improvement as claimed in claim 1 in which said first and second indexing means include a common control means for automatically indexing said film support assembly from a first position to a last position along said first lines.

9. The improvement as claimed in claim 8 in which said control means have means for returning said film support assembly along said first lines to a position beyond said first position and for returning said film support assembly in the direction of said last position to said first position so as to accurately locate said film support assembly at said first position.

10. The improvement as claimed in claim 8 in which said first indexing means includes a means for providing the smallest incremental advance expected to be needed of said film support assembly along said first lines, and a member cooperating therewith and adapted to alter said smallest incremental advance by whole number multiples thereof.

11. The improvement as claimed in claim 8 in which said first indexing means includes:

a horizontally positioned lead screw operatively connected to said film support assembly for indexing said assembly along said first lines;

a detent wheel having recesses on the periphery thereof and being fixed to said lead screw to rotate it;

a programming plate having at least one recess on the periphery thereof and being detachably fixed to said detent wheel to rotate therewith;

means for rotating said detent wheel under the control of said common control means;

control level means operatively connected to said common control means and adapted to engage said recess on said programming plate and stop the rotation thereof;

said recesses on said detent wheel being arranged to provide the smallest incremental advance expected to be needed of said film support assembly along said first lines as represented by the angular distance between adjacent recesses thereon; and said one recess on said programming plate being aligned with one of the recesses of said detent wheel and being adapted to control the rotation of said detent wheel in cooperation with said control lever means.

12. The improvement as claimed in claim 8 in which said common control means also include means for automatically returning said film support assembly from said last position to said first position and for indexing said assembly one line in a direction which is perpendicular to said first lines.

13. The improvement as claimed in claim 8 in which said second indexing means includes a means for providing the smallest incremental advance expected to be needed of said film support assembly along said second lines, and a member cooperating therewith and adapted to alter said smallest incremental advance by whole number multiples thereof.

14. The improvement as claimed in claim 8 in which said second indexing means includes:

a vertically positioned lead screw operatively connected to said film support assembly for indexing said assembly along said second lines;

a detent wheel having recesses on the periphery thereof and being fixed to said lead screw to rotate it;

a programming plate having at least one recess on the periphery thereof and being detachably fixed to said detent wheel to rotate therewith;

means for rotating said detent wheel under the control of said common control means;

control level means operatively connected to said common control means and adapted to engage said recess on said programming plate and stop the rotation thereof;

said recesses on said detent wheel being arranged to provide the smallest incremental advance expected to be needed of said film support assembly along said second lines as represented by the angular distance between adjacent recesses thereon; and said one recess on said programming plate being aligned with one of the recesses of said detent wheel and being adapted to control the rotation of said detent wheel in cooperation with said control lever means.